US008311238B2

(12) United States Patent
Kimijima

(10) Patent No.: US 8,311,238 B2
(45) Date of Patent: Nov. 13, 2012

(54) AUDIO SIGNAL PROCESSING APPARATUS, AND AUDIO SIGNAL PROCESSING METHOD

(75) Inventor: Tadaaki Kimijima, Kanagawa (JP)

(73) Assignee: Sony Corporation, Tokyo (JP)

( * ) Notice: Subject to any disclaimer, the term of this patent is extended or adjusted under 35 U.S.C. 154(b) by 1250 days.

(21) Appl. No.: 11/594,300

(22) Filed: Nov. 8, 2006

(65) Prior Publication Data

US 2007/0110258 A1 May 17, 2007

(30) Foreign Application Priority Data

Nov. 11, 2005 (JP) ................................ 2005-327237

(51) Int. Cl.
*H04B 15/00* (2006.01)

(52) U.S. Cl. ..................... 381/94.3; 381/94.2; 381/94.1; 381/97; 381/98

(58) Field of Classification Search ................ 381/2, 98, 381/17, 18, 101, 102, 103, 119, 306, 309, 381/310, 307, 94.1, 94.2, 94.3, 94.7, 92, 381/26, 66, 97
See application file for complete search history.

(56) References Cited

U.S. PATENT DOCUMENTS

| | | | | |
|---|---|---|---|---|
| 3,825,684 | A * | 7/1974 | Ito et al. | 381/22 |
| 4,747,142 | A | 5/1988 | Tofte | |
| 4,941,177 | A * | 7/1990 | Mandell et al. | 381/22 |
| 5,197,100 | A | 3/1993 | Shiraki | |
| 5,386,082 | A | 1/1995 | Higashi | |
| 5,537,435 | A | 7/1996 | Carney et al. | |
| 5,555,310 | A | 9/1996 | Minami et al. | |
| 5,636,283 | A | 6/1997 | Hill et al. | |
| 5,742,688 | A | 4/1998 | Ogawa et al. | |
| 6,078,669 | A | 6/2000 | Maher | |
| 6,130,949 | A | 10/2000 | Aoki et al. | |
| 6,269,166 | B1 | 7/2001 | Matsuo et al. | |
| 6,920,223 | B1 | 7/2005 | Fosgate | |
| 2003/0152236 | A1* | 8/2003 | Morikawa | 381/17 |
| 2005/0169482 | A1 | 8/2005 | Reams et al. | |
| 2006/0067541 | A1* | 3/2006 | Yamada et al. | 381/98 |
| 2007/0055497 | A1 | 3/2007 | Kimijima | |
| 2007/0098181 | A1 | 5/2007 | Noguchi | |
| 2008/0019531 | A1 | 1/2008 | Kimijima | |
| 2008/0019533 | A1 | 1/2008 | Noguchi | |

(Continued)

FOREIGN PATENT DOCUMENTS

| | | | |
|---|---|---|---|
| EP | 0593128 | A1 | 4/1994 |

(Continued)

*Primary Examiner* — Vivian Chin
*Assistant Examiner* — Leshui Zhang
(74) *Attorney, Agent, or Firm* — Wolf, Greenfield & Sacks, P.C.

(57) ABSTRACT

An audio signal processing apparatus includes: a dividing section dividing each of audio signals of a plurality of channels into a plurality of frequency bands; a phase difference calculating section calculating a phase difference between the audio signals of the plurality of channels, for each of the plurality of frequency bands divided by the dividing section; a level ratio calculating section calculating a level ratio between the audio signals of the plurality of channels, for each of the plurality of frequency bands divided by the dividing section; and an audio signal processing section performing output gain setting with respect to divided signals obtained by the dividing section, on the basis of the phase difference and the level ratio for each of the plurality of frequency bands calculated by the phase difference calculating section and the level ratio calculating section.

8 Claims, 17 Drawing Sheets

U.S. PATENT DOCUMENTS

2008/0130918 A1 6/2008 Kimijima

FOREIGN PATENT DOCUMENTS

| | | | |
|---|---|---|---|
| EP | 0608937 | A1 | 8/1994 |
| GB | 1411408 | A | 10/1975 |
| JP | 61-081214 | U | 4/1986 |
| JP | 2-298200 | | 12/1990 |
| JP | 03-236691 | A | 10/1991 |
| JP | 04-249484 | A | 9/1992 |
| JP | 04-296200 | | 10/1992 |
| JP | 05-060096 | U | 8/1993 |
| JP | 08-248070 | A | 9/1996 |
| JP | 09-172418 | A | 6/1997 |
| JP | 09-200900 | A | 7/1997 |
| JP | 09-511880 | A | 11/1997 |
| JP | 10-066198 | A | 3/1998 |
| JP | 10-136494 | A | 5/1998 |
| JP | 11-113097 | A | 4/1999 |
| JP | 2001-007769 | A | 1/2001 |
| JP | 2001-069597 | A | 3/2001 |
| JP | 2002-078100 | A | 3/2002 |
| JP | 2002-95096 | A | 3/2002 |
| JP | 2003-79000 | A | 3/2003 |
| JP | 2003-516069 | A | 5/2003 |
| JP | 2003-274492 | A | 9/2003 |
| JP | 2004-064363 | A | 2/2004 |
| JP | 2004-135023 | A | 4/2004 |
| JP | 2004-333592 | A | 11/2004 |
| JP | 2006-014220 | A | 1/2006 |
| JP | 2006-080708 | A | 3/2006 |
| JP | 2006-121152 | A | 5/2006 |
| WO | WO 99/31938 | A1 | 6/1999 |

* cited by examiner

AUDIO SIGNAL PROCESSING APPARATUS, AND AUDIO SIGNAL PROCESSING METHOD

CROSS REFERENCES TO RELATED APPLICATIONS

The present invention contains subject matter related to Japanese Patent Application JP 2005-327237 filed in the Japanese Patent Office on Nov. 11, 2005, the entire contents of which are incorporated herein by reference.

BACKGROUND OF THE INVENTION

1. Field of the Invention

The present invention relates to an audio signal processing apparatus, and an audio signal processing method, for performing audio signal processing with respect to the audio signal of a sound source localized at a given angle.

2. Description of the Related Art

Various kinds of sound sources are included in the audio signal of contents recorded on a CD (Compact Disc), a DVD (Digital Versatile Disc), or the like or of contents such as a TV (television) broadcast program. For example, in the case of contents in which music is recorded, sound sources such as a singing voice and the sound of a musical instrument are included in the audio signal. Further, in the case where the contents is a TV broadcast program, sound sources such as the voice of the cast, sound effect, the sound of laughing, and applause are included in the audio signal.

Although these sound sources are often recorded using different microphones at the time of recording, even in that case, the audio signals themselves are eventually mixed down to the number of channels determined in advance, such as 2 ch (channels) or 5.1 ch. At this time, by performing mixing or the like, an adjustment is performed so that the respective sound sources are localized in corresponding directions.

Examples of the related art include one disclosed in Japanese Unexamined Patent Application Publication No. 2-298200.

SUMMARY OF THE INVENTION

When the contents obtained as described above is reproduced (received/demodulated) on the reproducing apparatus or TV receiver side, the reproduced audio is obtained as one replicating the localization directions of the respective sound sources.

However, depending on the user's preference or the like, the localization sensation of sound source intended on the producer's side may not be accepted. Also, contrivances to increase the variety of ways to enjoy the contents are required, such as extracting only a sound source localized in a given direction. Accordingly, it is required to perform such adjustment as extracting a sound source localized in a given direction, or increasing/decreasing or removing the sound image thereof.

In view of the above-mentioned problems, it is desirable to configure an audio signal processing apparatus as follows.

That is, first, the audio signal processing apparatus includes dividing means for dividing each of audio signals of a plurality of channels into a plurality of frequency bands.

Further, the audio signal processing apparatus includes phase difference calculating means for calculating a phase difference between the audio signals of the plurality of channels, for each of the plurality of frequency bands divided by the dividing means.

Further, the audio signal processing apparatus includes level ratio calculating means for calculating a level ratio between the audio signals of the plurality of channels, for each of the plurality of frequency bands divided by the dividing means.

Furthermore, the audio signal processing apparatus includes audio signal processing means for performing output gain setting with respect to divided signals obtained by the dividing means, on the basis of the phase difference and the level ratio for each of the plurality of frequency bands calculated by the phase difference calculating means and the level ratio calculating means.

Here, when each of the audio signals of the plurality of systems is divided into the plurality of frequency bands, a plurality of sound sources included in each of the audio signals can be divided. Accordingly, the phase difference and level ratio of the audio signals of the plurality of systems that have been subjected to the band division serve as information indicative of the localization direction of the sound source for each of individual frequency bands. Therefore, by performing audio signal processing with respect to the divided outputs on the basis of information on the phase difference and level ratio of the respective audio signals of the plurality of systems obtained for each of these individual frequency bands as described above, the sound source adjustment can be performed for each individual localization angle, such as by extracting or removing only a sound source localized in a given direction and further adjusting the sound volume thereof.

As described above, according to the present invention, sound source adjustment can be performed for each individual localization direction, such as by extracting or removing only a sound source localized in a given direction and further adjusting the sound volume thereof.

DESCRIPTION OF THE PREFERRED EMBODIMENTS

<First Embodiment>

The best mode for carrying out the present invention (hereinafter will be referred to as an embodiment) will be described below.

Figure 1:
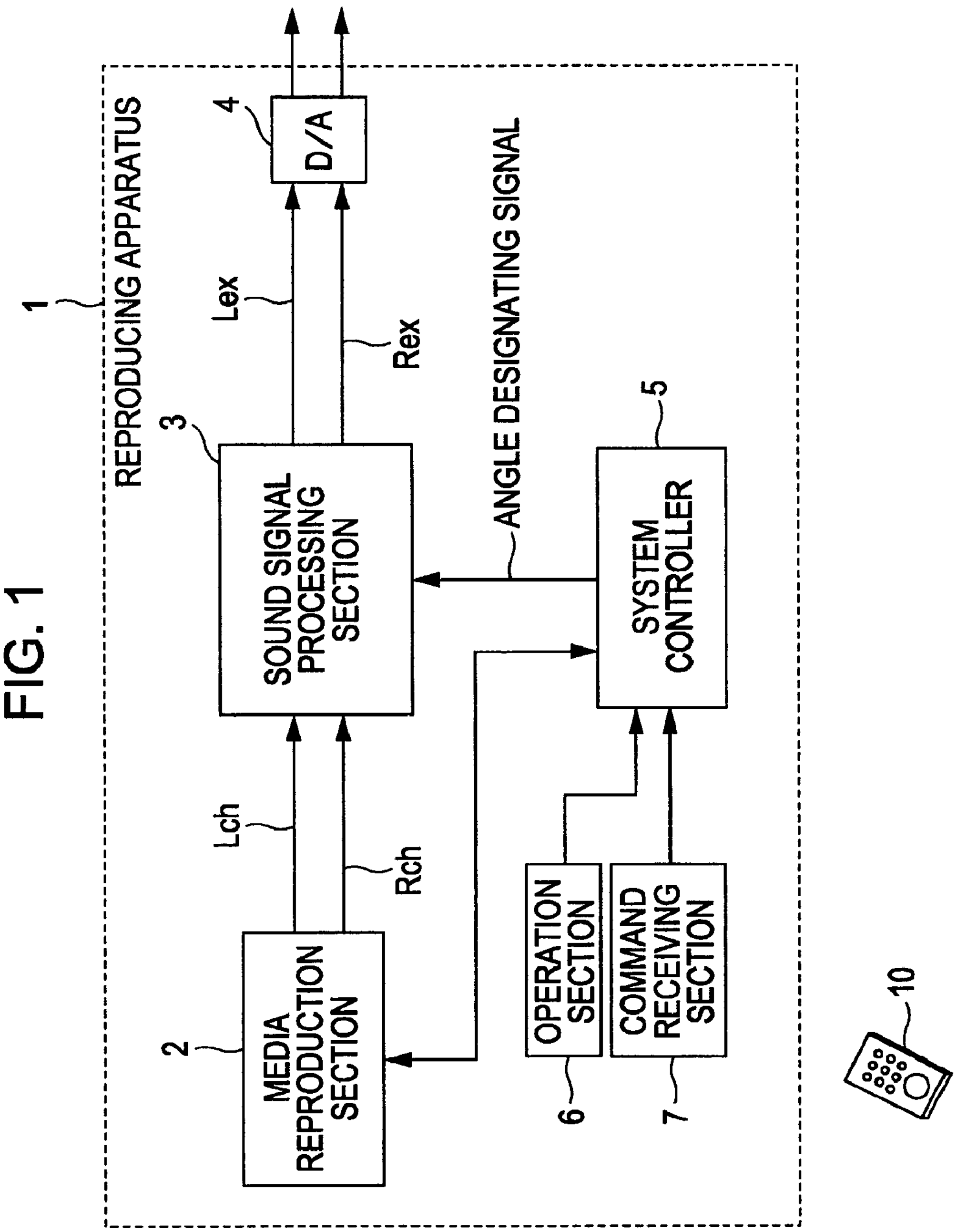
FIG. 1 is a block diagram showing the internal configuration of a reproducing apparatus including an audio signal processing apparatus according to a first embodiment of the present invention.

FIG. 1 is a block diagram showing the internal configuration of a reproducing apparatus 1 including an audio signal processing apparatus according to an embodiment of the present invention.

The reproducing apparatus 1 includes a media reproduction section 2 illustrated in the drawing, and can perform reproduction with respect to a predetermined recording medium, for example, an optical disk recording medium such a CD (Compact Disc), a DVD (Digital Versatile Disc), or a Blu-Ray Disc, a magnetic disc such as an MD (Mini Disc: magneto-optical disk) or a hard disk, a recording medium having a built-in semiconductor memory, or the like.

In this case, it is assumed that contents due to audio signals of two systems, Lch (channel) and Rch, are recorded in the recording medium to which the media reproduction section 2 corresponds. These Lch and Rch audio signals reproduced by the media reproduction section 2 are supplied to an audio signal processing section 3 as the audio signal processing apparatus according to the embodiment.

In accordance with the Lch and Rch audio signals from the media reproduction section 2, and an angle designating signal from a system controller 5 that will be described later, the audio signal processing section 3 is adapted to perform required audio signal processing with respect to the audio signal of a sound source localized at the designated angle (direction). Then, the Lch and Rch audio signals (hereinafter, referred to as the audio signal Lex and the audio signal Rex) on which the audio signal processing has been thus performed are supplied to a D/A converter 4.

It should be noted that the internal configuration of the audio signal processing section 3 will be described later.

The audio signals Lex and Rex from the audio signal processing section 3 are subjected to D/A conversion by the D/A converter 4 and then output as an Lch audio signal output and an Rch audio signal output.

The system controller 5 is configured by a microcomputer including a ROM (Read Only Memory), a RAM (Random Access Memory), and a CPU (Central Processing Unit), and performs overall control of the reproducing apparatus 1.

The system controller 5 includes an operation section 6 and a command receiving section 7 illustrated in the drawing. The operation section 6 includes various operators provided so as to appear on the exterior of the casing of the reproducing apparatus 1, and command signals according to operations on these operators are supplied to the system controller 5. Further, the command receiving section 7 receives a command signal due to, for example, an infrared signal or the like issued from a remoter commander 10 shown in the drawing. Various operators are also provided on the remote commander 10. The command receiving section 7 is adapted to supply to the system controller 5 command signals corresponding to operations on these operators on the remote commander 10.

The system controller 5 is adapted to execute various control operations according to the command signals from the operation section 6 and the command receiving section 7. Operations corresponding to operation inputs from the user are thus executed in the reproducing apparatus 1.

For example, the operation section 6, and the remote commander 10 are each provided with an operator for giving a reproducing instruction with respect to the contents recorded in a recording medium loaded onto the media reproduction section 2. In response to the input of a command signal corresponding to an operation on the operator, the system controller 5 controls the media reproduction section 2 to start the reproduction of the contents.

Figure 2:
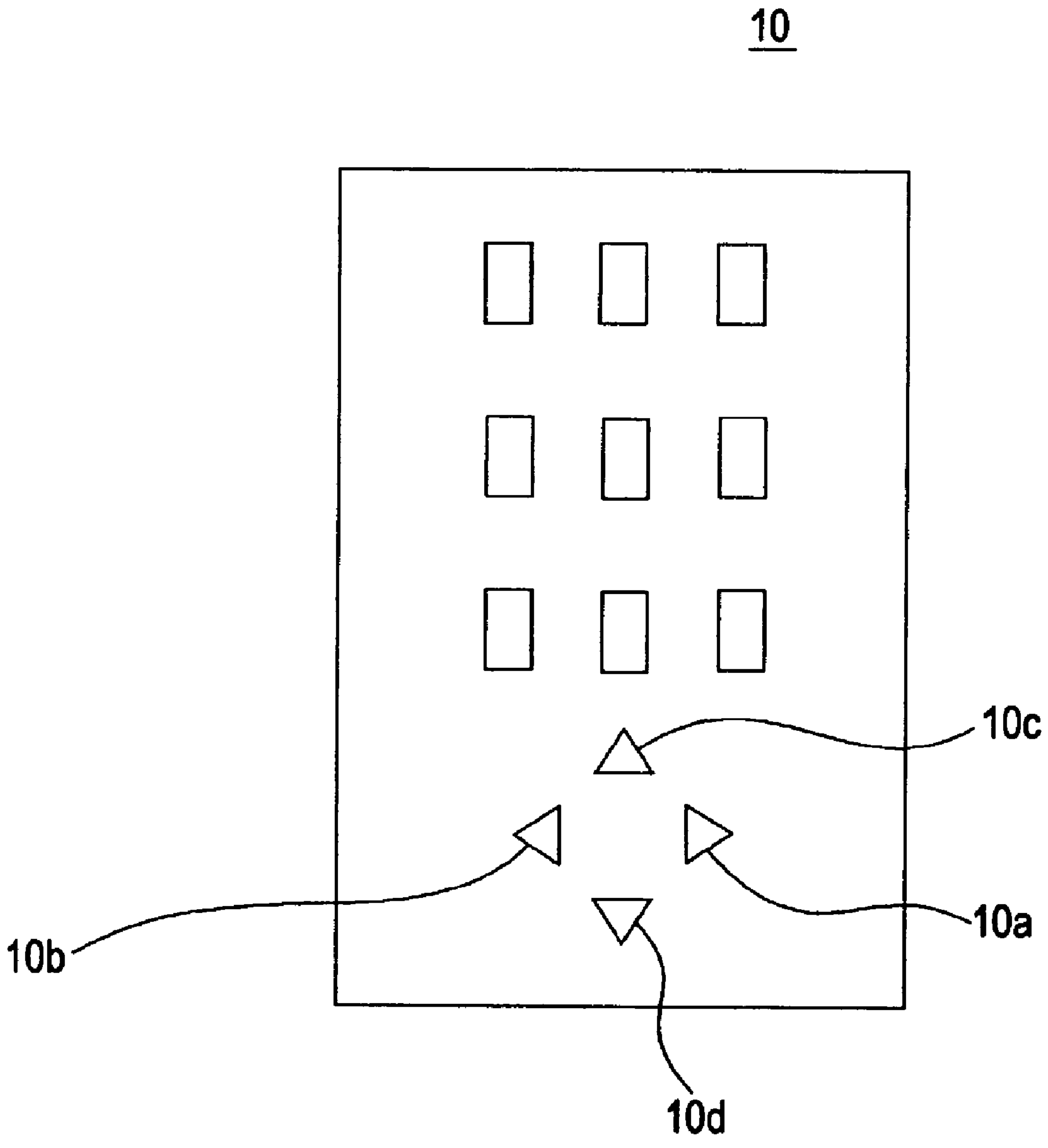
FIG. 2 is an exterior view of a remote commander included in the reproducing apparatus according to an embodiment of the present invention.

Further, in this case, operators for designating direction as shown in FIG. 2 are provided on the remoter commander 10. That is, a right key 10*a*, a left key 10*b*, an up key 10*c*, and a down key 10*d* as shown in FIG. 2 are provided.

The user can designate and input a localization angle with respect to the reproducing apparatus 1 by operating the right key 10*a* or the left key 10*b* mentioned above.

Returning to FIG. 1, in response to the input of a command signal corresponding to the operation of the right key 10*a*, left key 10*b*, the system controller 5 generates an angle designating signal to be supplied to the audio signal processing section 3. That is, the angle designating signal refers to information for indicating the localization angle designated and input through the operation of the right key 10*a*, left key 10*b*.

Figure 3:
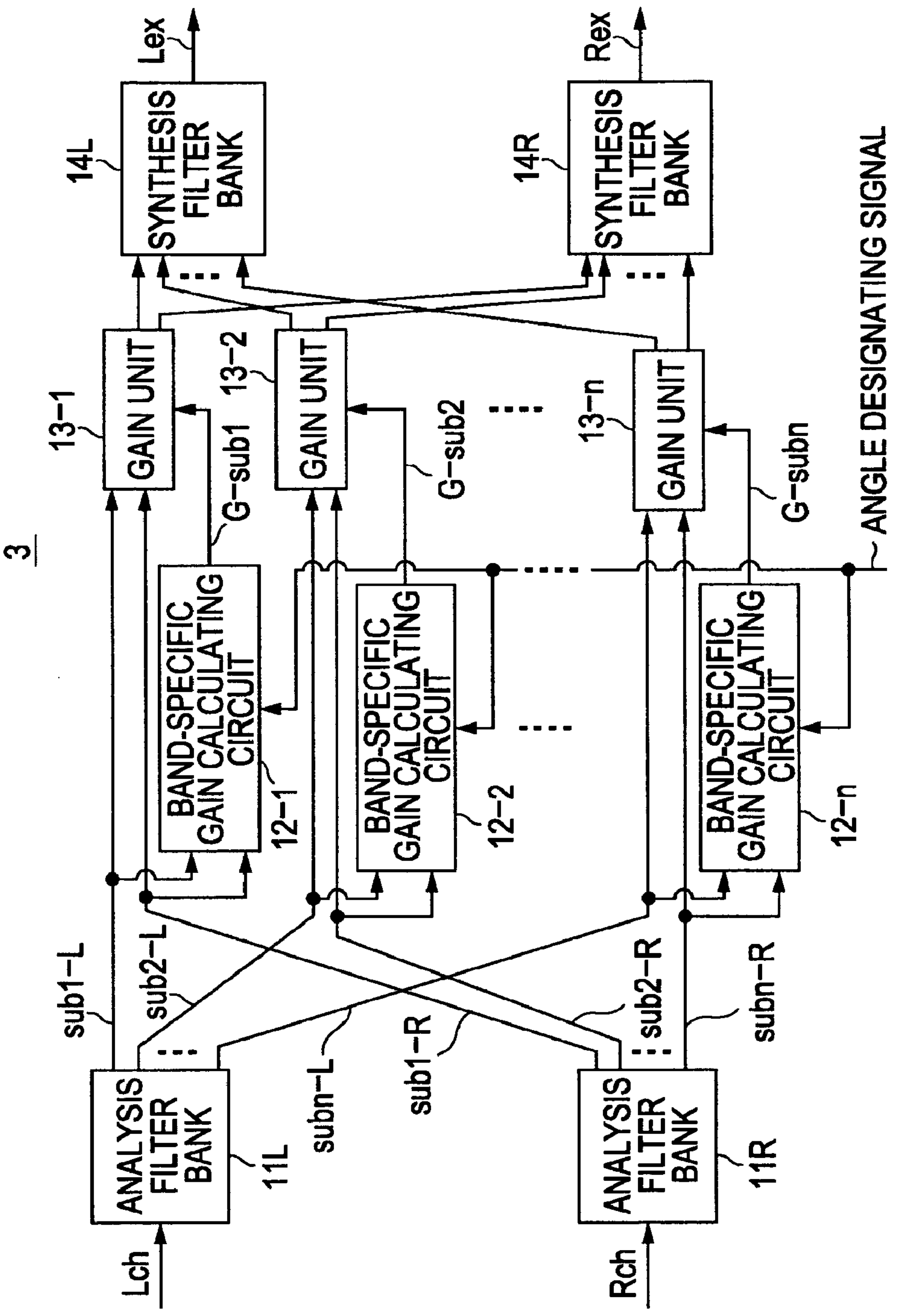
FIG. 3 is a block diagram showing the internal configuration of the audio signal processing apparatus according to the first embodiment.

Next, FIG. 3 shows the internal configuration of the audio signal processing section 3.

First, the audio signal processing section 3 includes an analysis filter bank 11L to which an Lch audio signal is input, and an analysis filter bank 11R to which an Rch audio signal is input. The analysis filter banks 11L, 11R are provided to divide an input audio signal into a plurality of predetermined frequency bands.

As is commonly known, as an example of the method for dividing an input signal component into a plurality of frequency bands, there is the so-called filter bank method using a DFT (Discrete Fourier Transform) filter bank, a wavelet filter bank, a QMF (Quadrature Mirror Filter), or the like. A filter bank includes one set of analysis filter bank and synthesis filter bank. This filter bank method is employed when processing the input signal for each individual band in accordance with the intended purpose, or the like, and is widely used for, for example, irreversible compression.

The analysis filter bank 11L divides the input Lch audio signal into n frequency bands of equal bandwidths, thus generating n sub-band signals (sub1-L, sub2-L . . . subn-L). As shown in the drawing, each of these individual n sub-band signals sub1-L to subn-L is supplied to a synthesis filter bank 14L via one of n gain units 13 (13-l to 13-n) with corresponding one of subscripts (1 to n) attached.

The synthesis filter bank 14L synthesizes the n sub-band signals (sub1-L to subn-L) supplied in this way and recombine them into the original audio signal form.

Likewise, the analysis filter bank 11R also divides the input Rch audio signal into n frequency bands of equal bandwidths, thus generating n sub-band signals (sub1-R, sub2-R . . . subn-R). In this case as well, each of these individual n sub-band signals sub1-R to subn-R is supplied to a synthesis filter bank 14R via one of the above-mentioned n gain units 13 (13-1 to 13-n) with corresponding one of subscripts (1 to n) attached.

The synthesis filter bank 14R synthesizes the n sub-band signals (sub1-R to subn-R) supplied and recombine them into the original audio signal form.

It should be noted that while in this example the input audio signal is divided by each of the analysis filter banks 11 into equal bandwidths, the input audio signal may be divided into unequal bandwidths.

Further, as shown in the drawing, each of the individual sub-band signals sub1-L to subn-L generated by the analysis filter bank 11L is also branched off and supplied to one of n band-specific gain calculating circuits 12 (12-1 to 12-n) with corresponding one of subscripts attached.

Likewise, each of the individual sub-band signals sub1-R to subn-R generated by the analysis filter bank 11R is also branched off and supplied to one of the band-specific gain calculating circuits 12-1 to 12-n with corresponding one of subscripts attached.

That is, the sub-band signal of Lch (hereinafter, also referred to as the sub-band signal sub-L) of the corresponding band and the sub-band signal of Rch (hereinafter, also referred to as the sub-band signal sub-R) of the corresponding band are thus input to each of the individual band-specific gain calculating circuits 12-1 to 12-n.

An angle designating signal from the system controller 5 shown in FIG. 1 is input to each of the individual band-specific gain calculating circuits 12-1 to 12-n. On the basis of the phase difference and level ratio between the Lch sub-band signal sub-L and the Rch sub-band signal sub-R respectively input as will be described later, and the above-mentioned angle designating signal, in order to extract the sound source localized at the angle designated by this angle designating signal, the band-specific gain calculating circuits 12 each calculate a gain G-sub to be set for the sub-band signal sub-L, sub-band signal sub-R of the corresponding band.

That is, the band-specific gain calculating circuits 12-1 to 12-n generate gains Gsub1 to G-subn to be set for the sub-band signals sub1-L to subn-L and sub-band signals sub1-R to subn-R of the respective bands, in such a manner that the band-specific gain calculating circuit 12-1 generates the gain Gsub-1 to be set for the sub-band signal sub1-L and the sub-band signal sub1-R, and the band-specific gain calculating circuit 12-2 generates the gain Gsub-2 to be set for the sub-band signal sub2-L and the sub-band signal sub2-R.

It should be noted that the internal configuration of the band-specific gain calculating circuits 12 as described above will be described later.

Each of the individual gains G-sub1 to G-subn calculated by the band-specific gain calculating circuits 12-1 to 12-n is supplied to the gain unit 13 with a corresponding subscript attached, from among the above-mentioned gain units 13-1 to 13-n.

On the basis of the supplied gain G-sub, each of the individual gain units 13 adjusts the gains of the sub-band signal sub-L and sub-band signal sub-R from the analysis filter bank 11L and analysis filter bank 11R, and supplies the sub-band signal sub-L and the sub-band signal sub-R to the synthesis filter bank 14L and the synthesis filter band 14R, respectively.

As described above, the synthesis filter banks 14L and 14R synthesize the sub-band signals sub1-L to subn-L and sub-band signals sub1-R to subn-R supplied from the gain units 13-1 to 13-n and recombine them into the original audio signal form for output.

Here, each of the sub-band signals sub-L and sub-band signals sub-R of respective bands supplied from the gain units 13-1 to 13-n has its gain adjusted in accordance with the gain G-sub for extracting the sound source localized at the angle designated by the angle designating signal, the gain G-sub being generated by the corresponding one of the band-specific calculating circuits 12.

For example, if the sound source localized at the designated angle is configured by Band 1 to Band 2 (sub-band signals sub1-L to sub1-L and sub-band signals sub1-R to sub2-R), the gain is adjusted so that gain=1 for only these sub-band signals sub1-L to sub1-L and sub-band signals sub1-R to sub2-R, and gain=0 for all the other bands.

Accordingly, the audio signal obtained by synthesizing and reconfiguring the sub-band signals of all the bands as described above can be reproduced as one in which only the sound source localized at the angle designated by the above-mentioned angle designating signal is extracted.

Herein, the audio signals respectively output from the synthesis filter banks 14L and 14R as described above, which can each be obtained as one in which only a sound source localized at the angle designated by an angle designating signal is extracted, are referred to as an audio signal Lex and an audio signal Rex, respectively.

Figure 4:
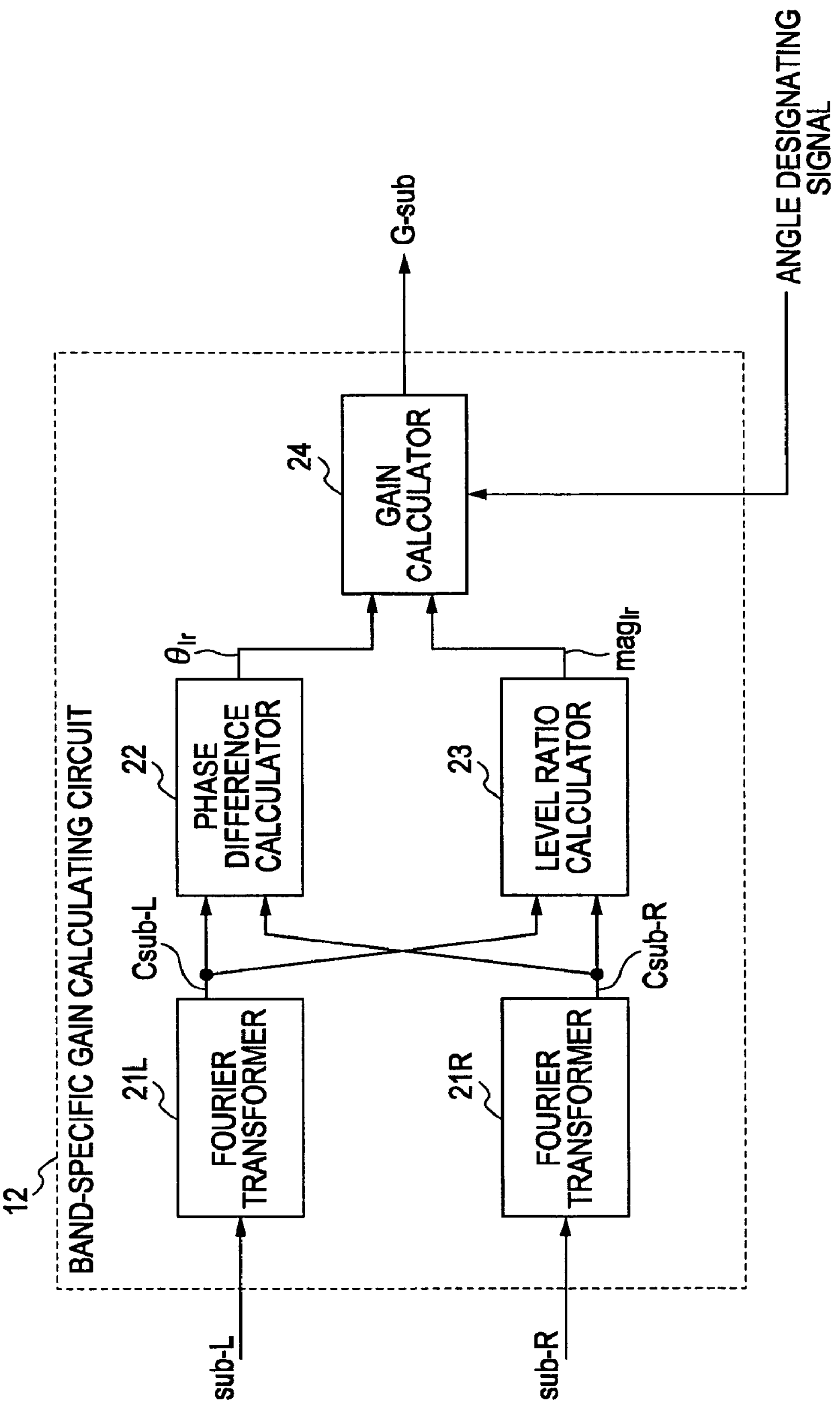
FIG. 4 a block diagram showing the internal configuration of a band-specific gain calculating circuit included in the audio signal processing apparatus according to the first embodiment.

FIG. 4 shows the internal configuration of each band-specific gain calculating circuit 12.

First, the sub-band signal sub-L from the analysis filter bank 11L shown in FIG. 3 is input to a Fourier transformer 21L where, for example, Fourier transformation processing such as FFT (Fast Fourier Transformation) is performed. A complex sub-band signal csub-L obtained by the Fourier transformation processing is supplied to a phase difference calculator 22 and a level ratio calculator 23.

Further, the sub-band signal sub-R from the analysis filter bank 11R is input to a Fourier transformer 21R to undergo Fourier transformation processing, and similarly supplied as a complex sub-band signal csub-R to the phase difference calculator 22 and the level ratio calculator 23.

The phase difference calculator 22 calculates the phase difference (time difference) between the complex sub-band signal csub-L from the Fourier transformer 21L and the complex sub-band signal csub-R from the Fourier transformer 21R.

Here, assuming that the complex sub-band signals csub-L and csub-R at time ω are L(ω) and R(ω), respectively, the phase difference $\theta_{lr}(\omega)$ between the complex sub-band signal csub-L and the complex sub-band signal csub-R at the time ω is given by the following [Expression 1].

It should be noted that in [Expression 1] below, $-180° \leqq \theta_{lr}(\omega) \leqq 180°$.

Further, Re(x) represents the real part of a complex number x, and Im(x) represents the imaginary part of the complex number x.

$$\theta_{lr}(\omega) = \left\{\tan^{-1}\left(\frac{\mathrm{Im}(L(\omega))}{\mathrm{Re}(L(\omega))}\right) - \tan^{-1}\left(\frac{\mathrm{Im}(R(\omega))}{\mathrm{Re}(R(\omega))}\right)\right\} * \frac{180}{\pi} \quad \text{[Expression 1]}$$

The phase difference calculator 22 calculates the phase difference $\theta_{lr}(\omega)$ between the complex sub-band signal csub-L from the Fourier transformer 21L and the complex sub-band signal csub-R from the Fourier transformer 21R on the basis of [Expression 1] mentioned above. Then, by sequentially outputting the phase difference $\theta_{lr}(\omega)$ calculated in this way, a phase difference signal $\theta_{lr}$ is supplied to a gain calculator 24.

Further, the level ratio calculator 23 calculates the level ratio between the complex sub-band signal csub-L from the Fourier transformer 21L and the complex sub-band signal csub-R from the Fourier transformer 21R.

Here, assuming that the complex sub-band signals csub-L and csub-R at the time ω are L(ω) and R(ω), respectively, the level ratio $mag_{lr}(\omega)$ between the complex sub-band signal csub-L and the complex sub-band signal csub-R at the time ω is given by the following [Expression 2].

It should be noted, however, that in [Expression 2] below, $-1 \leqq mag_{lr}(\omega) \leqq 1$.

$$mag_{lr}(\omega) = \frac{\sqrt{\mathrm{Re}(L(\omega))^2 + \mathrm{Im}(L(\omega))^2} - \sqrt{\mathrm{Re}(R(\omega))^2 + \mathrm{Im}(R(\omega))^2}}{\sqrt{\mathrm{Re}(L(\omega))^2 + \mathrm{Im}(L(\omega))^2} + \sqrt{\mathrm{Re}(R(\omega))^2 + \mathrm{Im}(R(\omega))^2}} \quad \text{[Expression 2]}$$

The level ratio calculator 23 calculates the level ratio $mag_{lr}(\omega)$ between the complex sub-band signal csub-L from the Fourier transformer 21L and the complex sub-band signal csub-R from the Fourier transformer 21R on the basis of [Expression 2] mentioned above. Then, by sequentially outputting the level ratio $mag_{lr}(\omega)$ calculated in this way, a level ratio signal $mag_{lr}$ is supplied to the gain calculator 24.

On the basis of the phase difference signal $\theta_{lr}$ from the phase difference calculator 22, the level ratio signal $mag_{lr}$ from the level ratio calculator 23, and further the angle designating signal from the system controller 5 shown in FIG. 1, in order to extract the sound source localized at the angle designated by this angle designating signal, the gain calculator 24 calculates the gain G-sub to be set for the Lch sub-band signal sub-L and Rch sub-band signal sub-R of the corresponding band.

It should be noted here that the localization of a sound image is based on human sensory perception and hence has no precise definition, and it is thus difficult to express this by a mathematical expression or the like. For example, with respect to Lch, Rch stereo audio signals, when the respective channel signals are completely equal, the sound source will be perceived as being located at about the middle of the respective speakers. Further, when a signal is included in only the left side channel, the sound source will be perceived as being located in the vicinity of the speaker on the left side.

In this specification, such sensory perception of the position of an audio signal is referred to as the localization, and the angle to the localization position of an audio signal with reference to a given point is referred to as the localization angle.

Of various known methods for localizing a sound image, there is one which causes the sound source to be perceived as being located in a specific position (specific direction) by means of the phase difference (time difference) and level ratio (sound pressure level ratio) between audio signals that reach the ears of a listener. As an example, in the method disclosed in Japanese Unexamined Patent Application Publication No. 2-298200, an audio signal is localized in a given direction by performing Fourier transformation on a signal from the sound source, and giving frequency-dependent phase difference and level ratio to the signal of each channel on the frequency axis.

Based on the idea of the reverse of this method, in this embodiment, the phase difference, level ratio between the audio signals of respective channels are regarded as information indicating the angle at which a sound source is localized. Accordingly, as described in the foregoing, in this embodiment, the localization angle of a sound source is determined by analyzing the phase difference between the audio signals of respective channels and the level ratio between the audio signals of respective channels.

In this regard, according to the configuration of the audio signal processing section 3 described in the foregoing, the phase difference $\theta_{lr}(\omega)$ and level ratio $mag_{lr}(\omega)$ between the audio signals of respective channels are determined for each individual frequency band. That is, the localization angle is thus determined for each of the individual audio signals of respective frequency bands.

Once the localization angle for each individual frequency band is determined by means of the phase difference $\theta_{lr}(\omega)$ and the level ratio $mag_{lr}(\omega)$ in this way, then, on the basis of the difference between the input angle designating signal and the localization angle for each of these individual frequency bands, the gain calculator 24 shown in FIG. 4 may calculate the gain to be set for the audio signals (sub1-L to subn-L and sub1-R to subn-R) of the respective frequency bands so that the sound source at the localization angle designated by the above-mentioned angle designating signal is extracted.

Specifically, in this embodiment, first, a phase difference gain $G_\theta(\omega)$ calculated in accordance with the localization angle determined from the phase difference $\theta_{lr}(\omega)$, and a level ratio gain $G_{mag}(\omega)$ calculated in accordance with the localization angle determined from the level ratio $mag_{lr}(\omega)$ are separately obtained. Then, the gain G-sub to be finally given to each of the sub-band signals sub-L, sub-R is determined by multiplying the phase difference gain $G_\theta(\omega)$ and the level ratio gain $G_{mag}(\omega)$ together.

That is, assuming that the gain G-sub at the time ω is a gain value G-sub(ω), the final gain G-sub is determined as follows:

$$G\text{-sub}(\omega) = G_\theta(\omega) \times G_{mag}(\omega)$$

Then, in the gain calculator 24, with the localization angle designated by an angle designating signal taken as angle, the phase difference gain $G_\theta(\omega)$ is determined by [Expression 3] below.

It should be noted that in [Expression 3] below, gradient is an arbitrary value of 0 or more, and top_width is an arbitrary value of 0°≦top_width≦180°.

Further, it is assumed that the localization angle angle that can be designated by the angle designating signal is −180°≦angle≦180°.

Further, it is assumed that the phase difference gain $G_\theta(\omega)$ is $0 \leqq G_\theta(\omega) \leqq 1$, and if the calculated value of $G_\theta(\omega)$ is smaller than 0, then $G_\theta(\omega)=0$.

[Expression 3]

$$(\theta_{lr}(\omega) > \text{angle} + \text{top\_width}) \quad (1)$$

$$(\text{angle} - \text{top\_width} \leq \theta_{lr}(\omega) \leq \text{angle} + \text{top\_width}) \quad (2)$$

$$(\theta_{lr}(\omega) < \text{angle} - \text{top\_width}) \quad (3)$$

$$G_\theta(\omega) = \begin{cases} 1 + \dfrac{\text{angle} + \text{top\_width} - \theta_{lr}(\omega)}{\text{gradient}} & (1) \\ 1 & (2) \\ 1 - \dfrac{\text{angle} - \text{top\_width} - \theta_{lr}(\omega)}{\text{gradient}} & (3) \end{cases}$$

Further, likewise, in the gain calculator 24, with the localization angle designated by an angle designating signal taken as angle, the level ratio gain $G_{mag}(\omega)$ is determined by [Expression 4] below.

It should be noted that in this [Expression 4] as well, gradient is an arbitrary value of 0 or more, and top_width is an arbitrary value of 0°≦top_width≦180°.

Further, it is assumed that the localization angle angle that can be designated by the angle designating signal is −180°≦angle≦180°.

Further, it is assumed that the level ratio gain $G_{mag}(\omega)$ is $0 \leqq G_{mag}(\omega) \leqq 1$, and if the calculated value of $G_{mag}(\omega)$ is smaller than 0, then $G_{mag}(\omega)=0$.

[Expression 4]

$$(mag_{lr}(\omega) * 180 > \text{angle} + \text{top\_width}) \quad (1)$$

$$(\text{angle} - \text{top\_width} \leq mag_{lr}(\omega) * 180 \leq \text{angle} + \text{top\_width}) \quad (2)$$

$$(mag_{lr}(\omega) * 180 < \text{angle} - \text{top\_width}) \quad (3)$$

$$G_{mag}(\omega) = \begin{cases} 1 + \dfrac{\text{angle} + \text{top\_width} - mag_{lr}(\omega) * 180}{\text{gradient}} & (1) \\ 1 & (2) \\ 1 - \dfrac{\text{angle} + \text{top\_width} - mag_{lr}(\omega) * 180}{\text{gradient}} & (3) \end{cases}$$

In above-mentioned [Expression 3] and [Expression 4], various settings are possible with respect to the values of gradient and top_width, examples of which will be described below.

Figure 5:
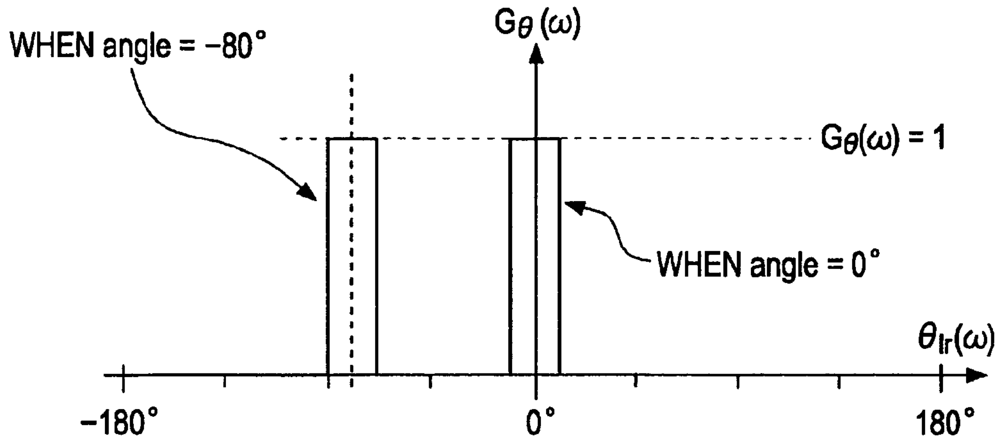
FIG. 5 is a diagram showing an example of the characteristics of a phase difference gain set according to the first embodiment.

First, a first example is directed to a method in which the values of gradient, top_width are fixed with respect to all frequency bands (sub-bands). FIG. 5 below illustrates the characteristics of the phase difference gain $G_\theta(\omega)$ obtained when, with the values of top_width, gradient fixed as top_width=20°, gradient=−80° in above-mentioned [Expression 3], the values of angle designated by the angle designating signal are set as angle=0° and angle=−80°.

FIG. 5 shows in the form of a graph the value of the phase difference gain $G_\theta(\omega)$ with the phase difference $\theta_{lr}(\omega)$ and the phase difference gain $G_\theta(\omega)$ taken along the horizontal and vertical axes, respectively. That is, FIG. 5 illustrates the value of the phase difference gain $G_\theta(\omega)$ corresponding to each individual localization angle.

First, in this first example, since the value of top_width is fixed to "20°", the width within which the value of the phase difference gain $G_\theta(\omega)$ becomes the maximum value (in this case, $G_\theta(\omega)=1$) is 40°. Specifically, when angle=0°, the range of the phase difference $\theta_{lr}(\omega)$ from −20° to 20° corresponds to top_width ($G_\theta(\omega)=1$), and when angle=−80°, the range of the phase difference $\theta_{lr}(\omega)$ from −100° to −600 corresponds to top_width ($G_\theta(\omega)=1$). That is, in [Expression 3] mentioned above (the same applies to [Expression 4]), since the range in which the gain becomes the maximum value is the range from "angle−top_width to angle+top_width", the range in which the gain becomes the maximum value is "top_width×2".

Further, in this case, since the value of gradient is fixed to "1", outside the range of top_width, that is, in the portion where ($\theta_{lr}(\omega)$>angle+top_width) or ($\theta_{lr}(\omega)$<angle−top_width), the phase difference gain $G_\theta(\omega)$ always becomes a negative value upon solving [Expression 3], and together with the condition that $0 \leqq G_\theta(\omega) \leqq 1$ mentioned above, the values of the phase difference gain $G_\theta(\omega)$ outside the range of this top_width all become "0".

Further, a second example is directed to a method in which, although gradient is fixed with respect to all frequency bands (sub-bands), the value of top_width is varied in accordance with the designated value of angle. In this case, for example, in accordance with the designated value of angle, the value of top_width is determined as follows:

top_width=|angle/4|

For example, FIG. 6 below illustrates the characteristics of the level ratio gain $G_{mag}(\omega)$ respectively obtained when in [Expression 4] mentioned above, for example, the value of gradient is fixed as gradient=20, and angle=0° and angle=−80° are designated as the values of angle.

Figure 6:
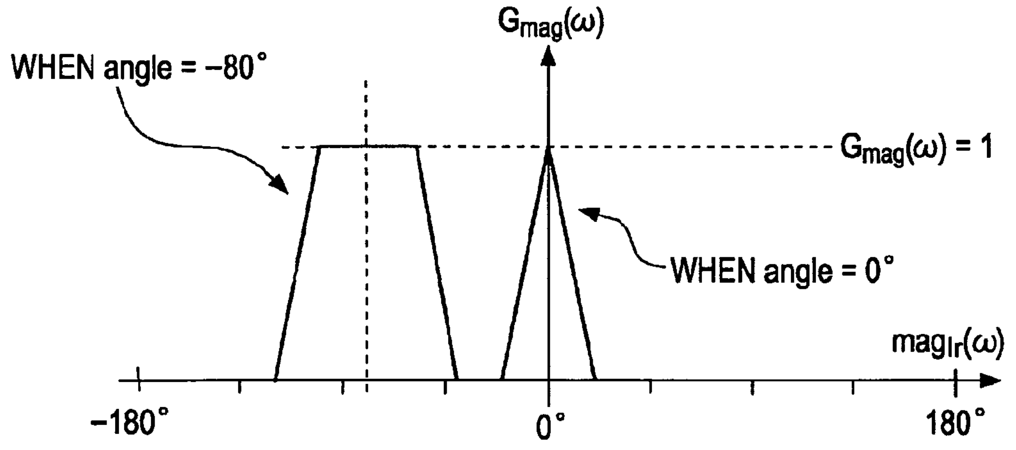
FIG. 6 is a diagram showing an example of the characteristics of a level ratio gain set according to the first embodiment.

FIG. 6 also shows in the form of a graph the value of the level ratio gain $G_{mag}(\omega)$ with the level ratio $mag_{lr}(\omega)$ and the level ratio gain $G_{mag}(\omega)$ taken along the horizontal and vertical axes, respectively.

In this case, since the value of top_width changes as "top_width=|angle/4|" in accordance with the designated value of angle, as illustrated in the drawing, when angle=0°, top_width=0°, and when angle=−80°, then top_width=20°.

Further, in this case, since the value of gradient is not set as "1" as in the case of the above-mentioned example but as "20", the values of the level ratio gain $G_{mag}(\omega)$ outside the range of top_width do not all become "0". That is, in this case, of the portion where ($mag_{lr}(\omega)\cdot 180$>angle+top_width) or ($mag_{lr}(\omega)\cdot 180$<angle−top_width) outside the range of top_width, a positive value is obtained as the calculation result of "Expression 4" within a range up to a certain value of the level ratio $mag_{lr}(\omega)$. That is, as illustrated in the drawing, even when outside the range of top_width, until the value of the level ratio $mag_{lr}(\omega)$ reaches a certain value, the value of the level ratio gain $G_{mag}(\omega)$ gradually decreases toward 0 with increasing distance from the value of angle.

As will be appreciated from the description of FIGS. 5 and 6, in [Expression 3] and [Expression 4], the value of gradient is a value for adjusting the slope of the portion outside the range of top_width with respect to the phase difference gain $G_\theta(\omega)$, level ratio gain $G_{mag}(\omega)$.

According to the above-mentioned method, the shape of the gain window can be freely adjusted through the setting of the value of top_width and the value of gradient as described above.

Further, in the foregoing description, according to the second example, for example, with top_width=|angle/4|, when the value of angle is 0°, the width of top_width is adapted to increase with increasing distance of the value of angle from 0°. This is based on the assumption that with the calculations according to [Expression 1] and [Expression 2] mentioned above, there may be cases where the calculated values of the phase difference $\theta_{lr}(\omega)$ and level ratio $mag_{lr}(\omega)$ may be obtained as values closer to "0" (that is, closer to the center).

That is, in the case where the values of the phase difference $\theta_{lr}(\omega)$ and level ratio $mag_{lr}(\omega)$ are obtained as values closer to the center, if the localization angle range narrowly extracted by top_width when an angle distant from 0° is designated by angle is rather narrow, the frequency band component localized at the localization angle to be extracted may not be properly extracted or, conversely, frequency band components other than that frequency band component may be extracted.

In contrast, if the width of top_width is enlarged with increasing distance of the designated value of angle from 0° as in the above-mentioned second example, the frequency band to be extracted can be properly extracted even when values closer to "0" are obtained through calculation as the values of the phase difference $\theta_{lr}(\omega)$ and level ratio $mag_{lr}(\omega)$ as described above.

Through [Expression 3] and [Expression 4] as described above, it is possible to determine the phase difference gain $G_\theta(\omega)$ and level ratio gain $G_{mag}(\omega)$ to be set for the corresponding sub-band signal in order to extract the sound source localized at the angle designated by the angle designating signal.

Further, as described above, in the gain calculator 24 shown in FIG. 4, the gain value G-sub(ω) to be finally set with respect to the corresponding sub-band signal sub-L, sub-R is calculated through the multiplication between the phase difference gain $G_\theta(\omega)$ and the level ratio gain $G_{mag}(\omega)$ obtained on the basis of [Expression 3] and [Expression 4] (G-sub(ω)= $G_\theta(\omega) \times G_{mag}(\omega)$).

Then, the gain calculator 24 sequentially outputs this gain value G-sub(ω) as the gain G-sub to be supplied to the gain unit 13 shown in FIG. 3.

Figure 7:
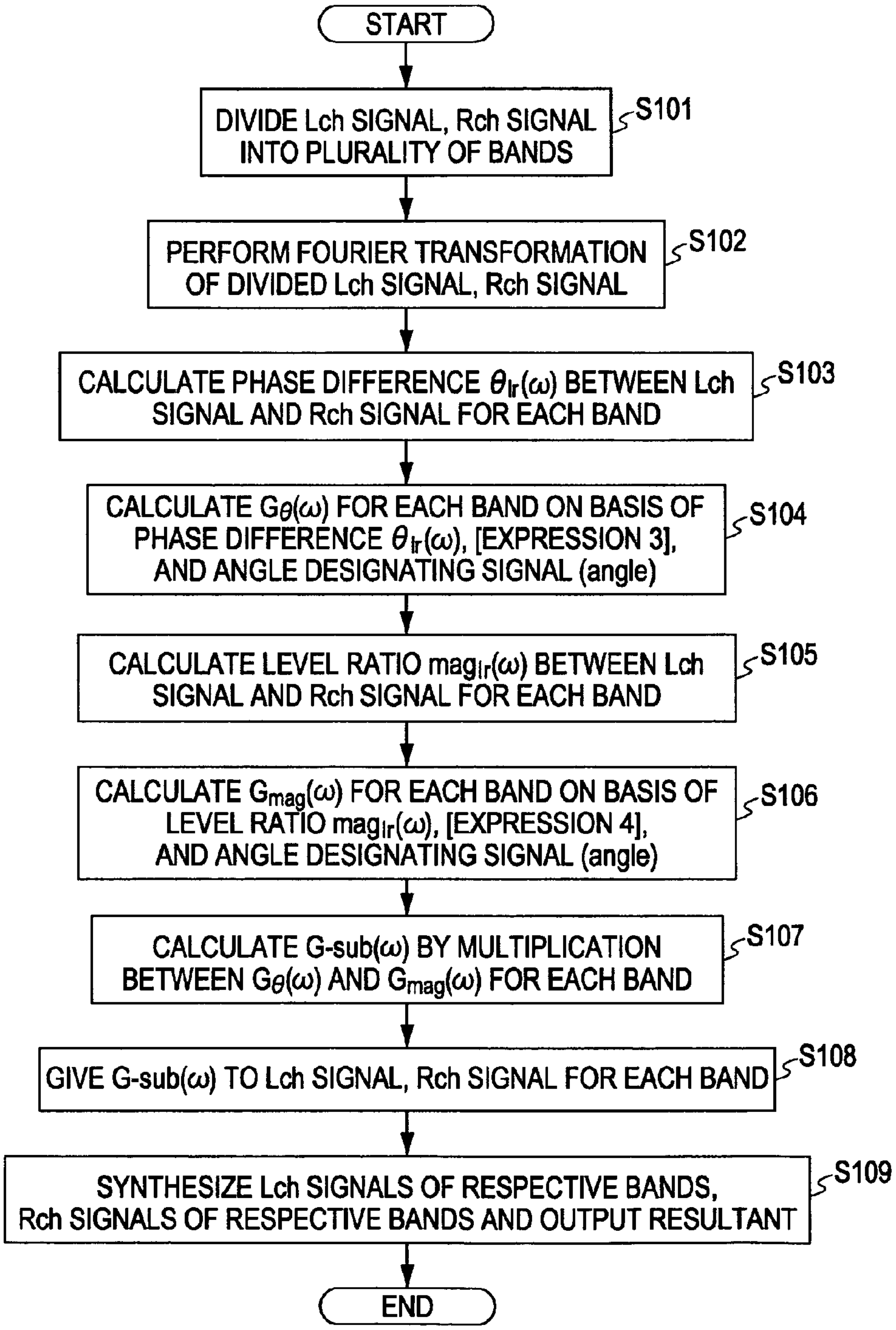
FIG. 7 is a flow chart showing the procedures of gain adjusting operation according to the first embodiment.

FIG. 7 shows in the form of a flowchart the procedures of a sound source extracting operation according to the first embodiment that has been described in the foregoing.

In FIG. 7, first, in step S101, the Lch signal and the Rch signal are each divided into a plurality of bands. That is, this operation corresponds to the operation of dividing the Lch signal and the Rch signal, which are respectively input to the analysis filter bank 11L and the analysis filter bank 11R shown in FIG. 3, into n frequency bands, thereby generating the sub-band signals sub1-L to subn-L and the sub-band signals sub1-R to subn-R, respectively.

In step S102 that follows, the Lch signal and the Rch signal thus divided are subjected to Fourier transformation. That is, Fourier transformation is performed on the sub-band signals sub-L and sub-R respectively input to the Fourier transformer 21L and the Fourier transformer 21R within each band-specific gain calculating circuit 12 shown in FIG. 4.

In step S103, the phase difference $\theta_{lr}(\omega)$ between the Lch signal and the Rch signal is calculated for each individual band (frequency band). That is, the phase difference calculator 22 in each band-specific gain calculating circuit 12 calculates the phase difference $\theta_{lr}(\omega)$ on the basis of the complex sub-band signal csub-L from the Fourier transformer 11L and the complex sub-band signal csub-R from the Fourier transformer 11R.

Then, in step S104, the phase difference gain $G_\theta(\omega)$ is calculated for each individual band on the basis of the phase difference $\theta_{lr}$, [Expression 3], and the angle designating signal (angle). That is, the gain calculator 24 in each band-specific gain calculating circuit 12 calculates the phase difference gain $G_\theta(\omega)$ on the basis of the phase difference $\theta_{lr}$ supplied from the phase difference calculator 22, the value of the angle designating signal (value of angle) supplied from the system controller 5, and [Expression 3] mentioned above.

Then, in step S105, the level ratio $mag_{lr}(\omega)$ between the Lch signal and the Rch signal is calculated for each individual band. That is, the level ratio calculator 23 in each band-specific gain calculating circuit 12 calculates the level ratio $mag_{lr}(\omega)$ on the basis of the complex sub-band signal csub-L from the Fourier transformer 11L and the complex sub-band signal csub-R from the Fourier transformer 11R.

Then, in step S106, the level ratio gain $G_{mag}(\omega)$ is calculated for each individual band on the basis of the level ratio $mag_{lr}(\omega)$, [Expression 4], and the angle designating signal (angle). That is, the gain calculator 24 in each band-specific gain calculating circuit 12 calculates the level ratio gain $G_{mag}(\omega)$ on the basis of the level ratio $mag_{lr}(\omega)$ supplied from the level ratio calculator 23, the value of the angle designating signal (value of angle) supplied from the system controller 5, and [Expression 4] mentioned above.

It should be noted that in this example, for the convenience of description, the calculation of the phase difference $\theta_{lr}(\omega)$/phase difference gain $G_\theta(\omega)$ and the calculation of the level ratio $mag_{lr}(\omega)$/level ratio gain $G_{mag}(\omega)$ are carried out one after the other. However, in the actual configuration, these calculations are carried out simultaneously and in parallel.

In step S107, the gain value G-sub(ω) is calculated by multiplying the phase difference gain $G_\theta(\omega)$ and the level ratio gain $G_{mag}(\omega)$ with each other for each individual band. This corresponds to the operation of multiplying the phase difference gain $G_\theta(\omega)$ generated in step S104 and the level ratio gain $G_{mag}(\omega)$ generated in step S106 with each other.

By step S107 described above, the final gain value G-sub (ω) to be set for each of the bands is determined by the gain calculator 24 in each band-specific gain calculating circuit 12.

In step S108 that follows, the gain value G-sub(ω) is given to the Lch signal and Rch signal for each individual band. That is, each of the gain units 13 shown in FIG. 3 gives the gain value G-sub(ω), which is supplied from the corresponding one of the band-specific gain calculating circuits 12, to the input sub-band signal sub-L and the sub-band signal sub-R.

Then, in step S109, the Lch signals of respective bands, and the Rch signals of respective bands are synthesized and output. That is, the Lch signals of respective bands supplied from the gain units 13-1 to 13-n are input to the synthesis filter bank 14L shown in FIG. 3, which then synthesizes these signals and outputs the resultant. Further, the Rch signals of respective bands supplied from the gain units 13-1 to 13-n are input to the synthesis filter bank 14R, which then synthesizes these signals and outputs the resultant.

Accordingly, as already described above, the audio signal Lex and the audio signal Rex, which can each be reproduced as a signal in which only the sound source localized at the angle (angle) designated by the angle designating signal is extracted, are output from the synthesis filter bank 14L and the synthesis filter bank 14R.

Since only those audio signal Lex and the audio signal Rex are output, it is possible to make the listener perceive as if only the sound source localized at the designated angle has been extracted. In other words, this allows only the sound source localized at the designated angle to be extracted.

While the foregoing description is directed to the case in which, in realizing the sound-source extracting operation according to this embodiment, the sound processing section 3 is configured by hardware that carries out the respective operations shown in FIG. 7, it is also possible to realize this operation partially or entirely by software processing. In this case, the audio signal processing section 3 may be configured by a microcomputer or the like that operates in accordance with a program for executing the corresponding processing shown in FIG. 7. In this case, the audio signal processing section 3 includes a recording medium such as a ROM, into which the above-mentioned program is recorded.

Further, in the first embodiment, in the calculations of [Expression 3] and [Expression 4], the values of the phase difference $\theta_{lr}(\omega)$ and level ratio $mag_{lr}(\omega)$ at a given point in time (time ($\omega$)) are used as the phase difference and the level ratio with respect to the audio signal of each channel. However, the results of the integration of the phase difference $\theta_{lr}(\omega)$ and level ratio $mag_{lr}(\omega)$ may also be used as the values of the phase difference and level ratio.

Further, in the first embodiment, the function for determining the gain $G_\theta(\omega)$ with the phase difference $\theta_{lr}(\omega)$ and angle serving as variables, and the function for determining the gain $G_{mag}(\omega)$ with the level ratio $mag_{lr}(\omega)$ and angle serving as variables as the above-mentioned [Expression 3] and [Expression 4] are used in calculating the gain value G-sub. Alternatively, the gain value may be determined by using a window function that defines the gain characteristics (window with respect to the gain) as shown in FIGS. 5, 6 mentioned above as they are for each individual localization angle (angle) that can be designated by the angle designating signal in advance.

That is, for example, in the case where angle=0° as shown in FIG. 5 mentioned above, the shape of the gain window at this time when angle=0° is determined in advance, and as a function that defines the shape of the gain window, a function for determining the gain $G_\theta(\omega)$ with the phase difference $\theta_{lr}(\omega)$ (localization angle) as a variable is generated and prepared in advance. Likewise, with respect to other values of angle as well, the shapes of the gain window to be set in correspondence with the values of angle at that time are determined in advance, and a function that defines each of those window shapes is generated and prepared in advance.

Further, with respect to the level ratio $mag_{lr}(\omega)$ as well, for each of the individual values of angle that can be designated, the shapes of the gain window to be set in correspondence with the respective values of angle are determined in advance, and as the function that defines each of those window shapes, a function with the level ratio $mag_{lr}(\omega)$ serving as a variable is generated and prepared in advance.

Then, when the value of angle is actually designated by the angle designating signal, one window function for the phase difference and one window function for the level ratio are selected in accordance with this designated value of angle, and the values of the calculated phase difference $\theta_{lr}(\omega)$ and level ratio $mag_{lr}(\omega)$ are substituted to the window functions, thereby calculating the phase difference gain $G_\theta(\omega)$ and the level ratio gain $G_{mag}(\omega)$, respectively.

It should be noted, however, that when the gain is calculated using a function with angle also serving as a variable as in [Expression 3] and [Expression 4] in this embodiment, unlike in the case of using a window function with only the phase difference $\theta_{lr}(\omega)$, level ratio $mag_{lr}(\omega)$ serving as a variable as described above, only one kind of function, that is, the function of each of [Expression 3] and [Expression 4], may be retained for each type of gain.

That is, as can be understood from the foregoing description, the method using a window function requires individual functions to be prepared in correspondence with the respective values of angle, and hence the requisite memory capacity for retaining the functions for gain calculation tends to increase. In contrast, when it suffices to retain only [Expression 3] and [Expression 4] as described above, it is possible to achieve a corresponding reduction in the requisite memory capacity.

Further, in this example the sound volume of a sound source localized at a designated angle is adjusted so that only the sound source localized at the designated angle is extracted and output. However, alternatively, it is also possible to carry out another audio signal processing such as reverb processing with respect to the sound source localized at the designated angle.

Specifically, in the case of reverb processing, the gain unit 13 serves as the reverb processing unit that executes the reverb processing, and may be adapted to perform reverb processing on each sub-band signal on the basis of a reverb coefficient (parameter for changing the level of reverb) calculated on the basis of the phase difference and level ratio.

Further, in this example the gain window of a designated angle is of a convex shape so that only the sound source localized at the designated angle is extracted. However, when, conversely, the sound source localized at a designated angle is to be removed, a gain window in which the portion of the designated localization angle becomes concave may be set or the like.

<Second Embodiment>

Next, a second embodiment of the present invention will be described.

According to the second embodiment, which is an application of the first embodiment, when reproducing a video signal synchronized with an audio signal, the extraction of the sound source is carried out in accordance with the zoom of a video.

Figure 8:
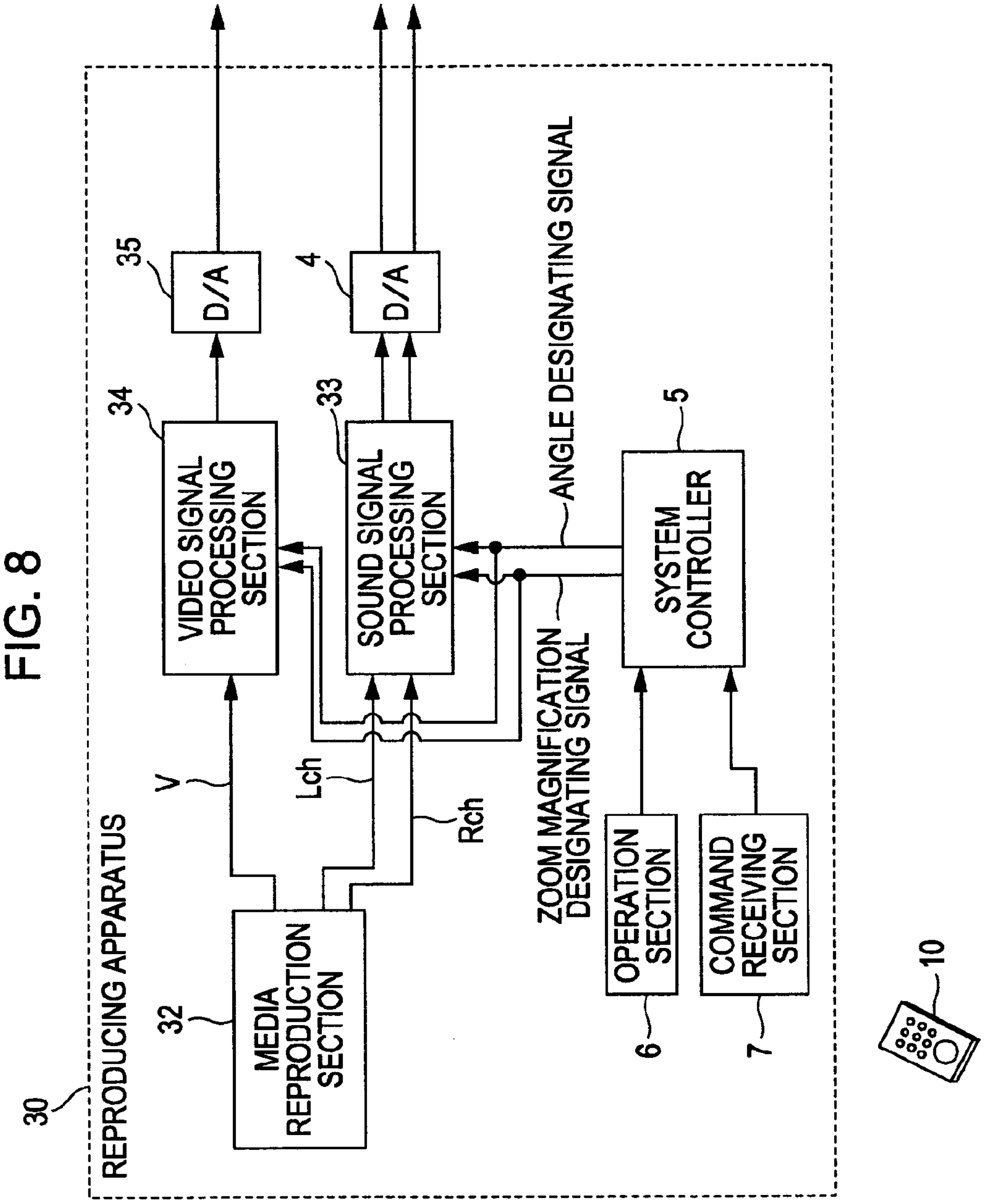
FIG. 8 is a block diagram showing the internal configuration of a reproducing apparatus including an audio signal processing apparatus according to a second embodiment of the present invention.

FIG. 8 shows the internal configuration of a reproducing apparatus 30 according to the second embodiment as described above.

It should be noted that in FIG. 8, the portions that have been already described with reference to FIG. 1 above are denoted by the same reference numerals and description thereof will be omitted.

First, in this case, audio signals as well as video signals synchronized with the audio signals are recorded in a recording medium that is subjected to reproduction by the reproducing apparatus 30. A media reproduction section 32 is adapted to perform reproduction with respect to audio signals and video signals recorded in the recording medium that has been loaded.

The Lch signal and the Rch signal as reproduced audio signals are supplied to an audio signal processing section 33. Further, a video signal V reproduced in synchronism with each of the Lch signal and Rch signal is supplied to a video signal processing section 34.

Here, in the second embodiment, the zoom operation with respect to a video signal can be performed by means of the up, down, left, and right keys (10*a* to 10*d* shown in FIG. 2) included in the remote commander 10.

As the zoom operation, the left/right direction on the screen can be designated by means of the right key 10*a*/left key 10*b*, and further zoom-in/zoom-out can be designated by means of the up key 10*c*/down key 10*d*.

In this case as well, in response to the input of a command signal corresponding to the right key 10*a*/left key 10*b* from the remote commander 10 via the command receiving section 7, the system controller 5 is adapted to output an angle designating signal. The output angle designating signal is supplied to the audio signal processing section 33, and is branched off in this case to be supplied also to the video signal processing section 34.

Further, in response to the input of a command signal corresponding to the up direction key 10*c*/down direction key 10*d*, the system controller 5 is adapted to output a zoom magnification designating signal as shown in the drawing. This zoom magnification designating signal is also supplied to the audio signal processing section 33 and the video signal processing section 34.

In addition to having the function endowed to the audio signal processing section 3 in the first embodiment, namely the function of extracting a sound source localized at the angle designated by an angle designating signal, the audio signal processing section 33 is adapted to adjust the gain of the sound source localized at the designated angle (or the gain of a sound source localized at an angle other than the designated angle) in accordance with the zoom magnification designating signal in this case. That is, the sound volume of the sound source localized at the angle designated by the angle designating signal (that is, the zoom position in this case) is thus adjusted in accordance with the zoom magnification of a video.

The internal configuration of the audio signal processing section 33 will be described later.

Further, the video signal processing section 34 performs various kinds of video signal processing with respect to the input video signal V. For example, image quality correcting processing such as contour correcting processing or gamma correcting processing is performed.

Further, particularly in this case, zoom processing of a video according to the above-mentioned angle designating signal and the zoom magnification designating signal is performed. Specifically, processing is performed so that in accordance with the left/right position on the screen designated by the angle designating signal, and the zoom magnification designated by the zoom magnification designating signal, a part of a video to be shown on the basis of the video signal V is zoomed in/zoomed out.

The video signal V on which the video signal processing has been performed by the video signal processing section 34 is output as shown in the drawing via a D/A converter 35.

Figure 9:
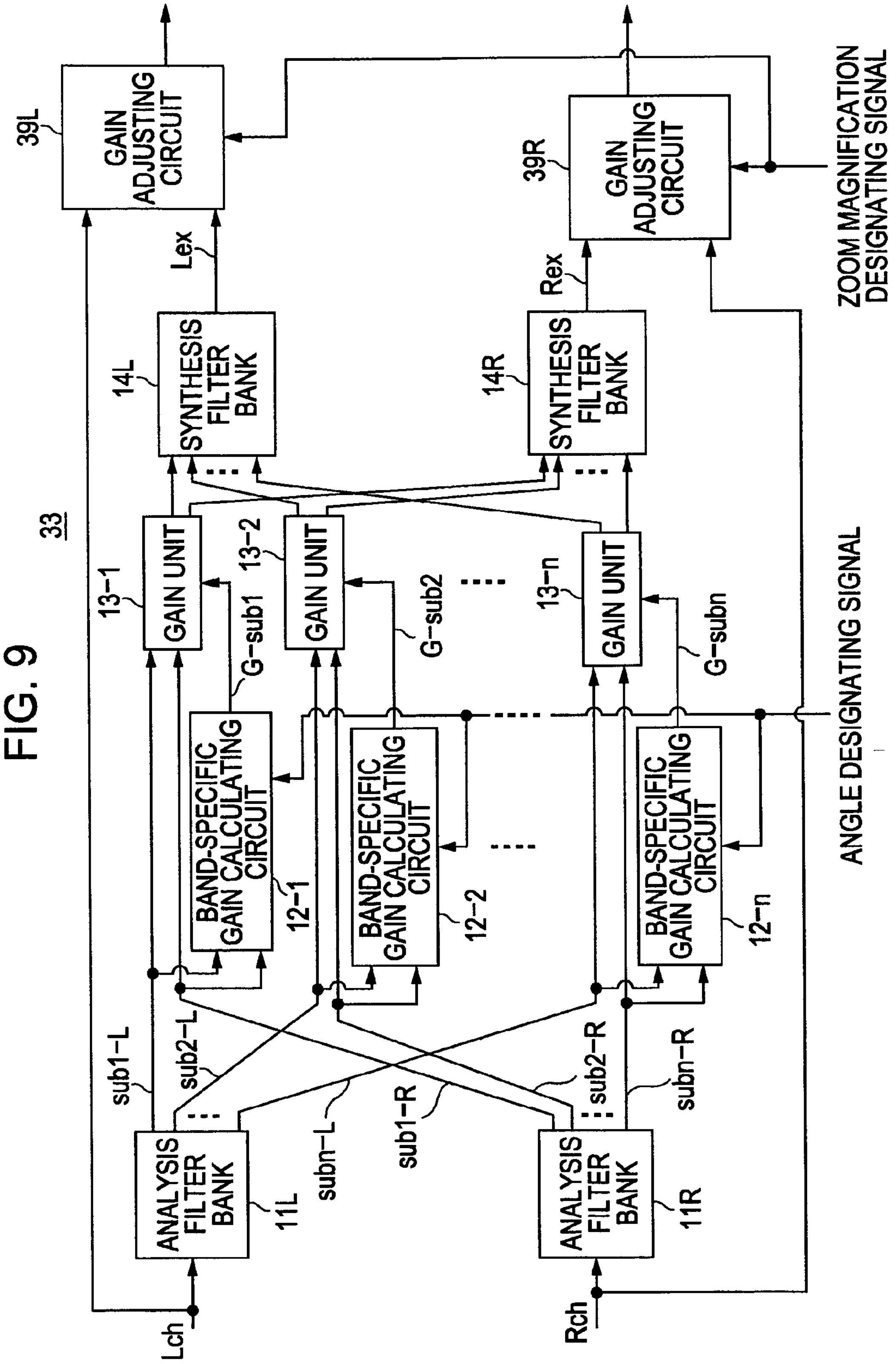
FIG. 9 is a block diagram showing the internal configuration of the audio signal processing apparatus according to the second embodiment.

FIG. 9 shows the internal configuration of the audio signal processing section 33.

It should be noted that in FIG. 9 as well, the portions that have been already described with respect to the first embodiment (FIG. 3) are denoted by the same reference numerals and description thereof is omitted.

In the audio signal processing section 33 in this case, as shown in the drawing, an Lch signal is input to the analysis filter bank 11L and branched off to be supplied also to a gain adjusting circuit 39L. Further, an Rch signal input to the analysis filter band 11R is branched off to be supplied also to a gain adjusting circuit 39R.

In addition to the above-mentioned Lch signal, the audio signal Lex from the synthesis filter bank 14L is input to the gain adjusting circuit 39L. Further, a zoom magnification designating signal from the system controller 5 shown in FIG. 8 is also input to the gain adjusting circuit 39L.

In the gain adjusting circuit 39L, the gain of the audio signal Lex or Lch signal is adjusted in accordance with the zoom magnification designated by the zoom magnification designating signal. That is, the gain adjustment is performed such that the gain of the audio signal Lex is raised (or the gain of the Lch signal is lowered) in response to an increase in zoom magnification (that is, zoom-in). Further, the gain adjustment is performed such that the gain of the audio signal Lex is lowered (or the gain of the Lch signal is raised) in response to a decrease in zoom magnification (that is, zoom-out).

Then, the gain adjusting circuit 39L performs synthesis (addition) of the gain-adjusted audio signal Lex and Lch signal and outputs the resultant.

Further, in addition to the above-mentioned Rch signal, the audio signal Rex from the synthesis filter bank 14R is input to the gain adjusting circuit 39R. Further, a zoom magnification designating signal from the system controller 5 is also input to the gain adjusting circuit 39R.

In the gain adjusting circuit 39R as well, the gain of the audio signal Rex or Rch signal is adjusted in accordance with the zoom magnification designated by the zoom magnification designating signal. That is, the gain adjustment is performed such that the gain of the audio signal Rex is raised (or the gain of the Rch signal is lowered) in response to an increase in zoom magnification (that is, zoom-in). Further, the gain adjustment is performed such that the gain of the audio signal Rex is lowered (or the gain of the Rch signal is raised) in response to a decrease in zoom magnification (that is, zoom-out).

Then, the gain adjusting circuit 39R also performs synthesis (addition) of the gain-adjusted audio signal Rex and Rch signal and outputs the resultant.

The outputs of the gain adjusting circuits 39L and 39R are externally output as audio signal outputs via the D/A converter 4 shown in FIG. 8.

In the configuration of the audio signal processing section 33 as described above, the audio signal Lex and the audio signal Rex are each obtained as a signal in which a sound source localized at the angle designated by the angle designating signal is extracted. That is, the sound source localized at the left-right position of a video designated by the angle designating signal is extracted. Further, according to the above-mentioned configuration, the sound volume of the sound source extracted in this way is adjusted in accordance with the designated zoom amplification. That is, the sound volume of the sound source that has been extracted as being localized at the zoom position of the video can be adjusted in accordance with the video zoom magnification.

In this regard, in the related art, there are video signal reproducing apparatuses or the like in which a part of a video is zoomed in/zoomed out in accordance with zoom operation. This makes it possible to enlarge the portion that is desired to be viewed, such as by zooming-in to the center of the video.

However, in such an apparatus of the related art endowed with the video zoom function, the audio signal is output as usual even in the case when the zoom-in is performed. Accordingly, there is a possibility that the sense of integration between video and audio may be lost to make the user feel a sense of incongruity, such as when, depending on the case, sound from the portions that are no longer displayed on the screen due to the zoom-in is included in the audio signal.

In contrast, according to the second embodiment, adjustment of an audio signal is also performed in synchronization with the video zoom function. Specifically, in accordance with a zoom-in/zoom-out angle, the sound volume of a sound image localized at that angle can be adjusted in accordance with the zoom magnification. Accordingly, the sense of incongruity arising from a mismatch between the zoomed-in video and audio as in the related art can be effectively reduced.

Figure 10:
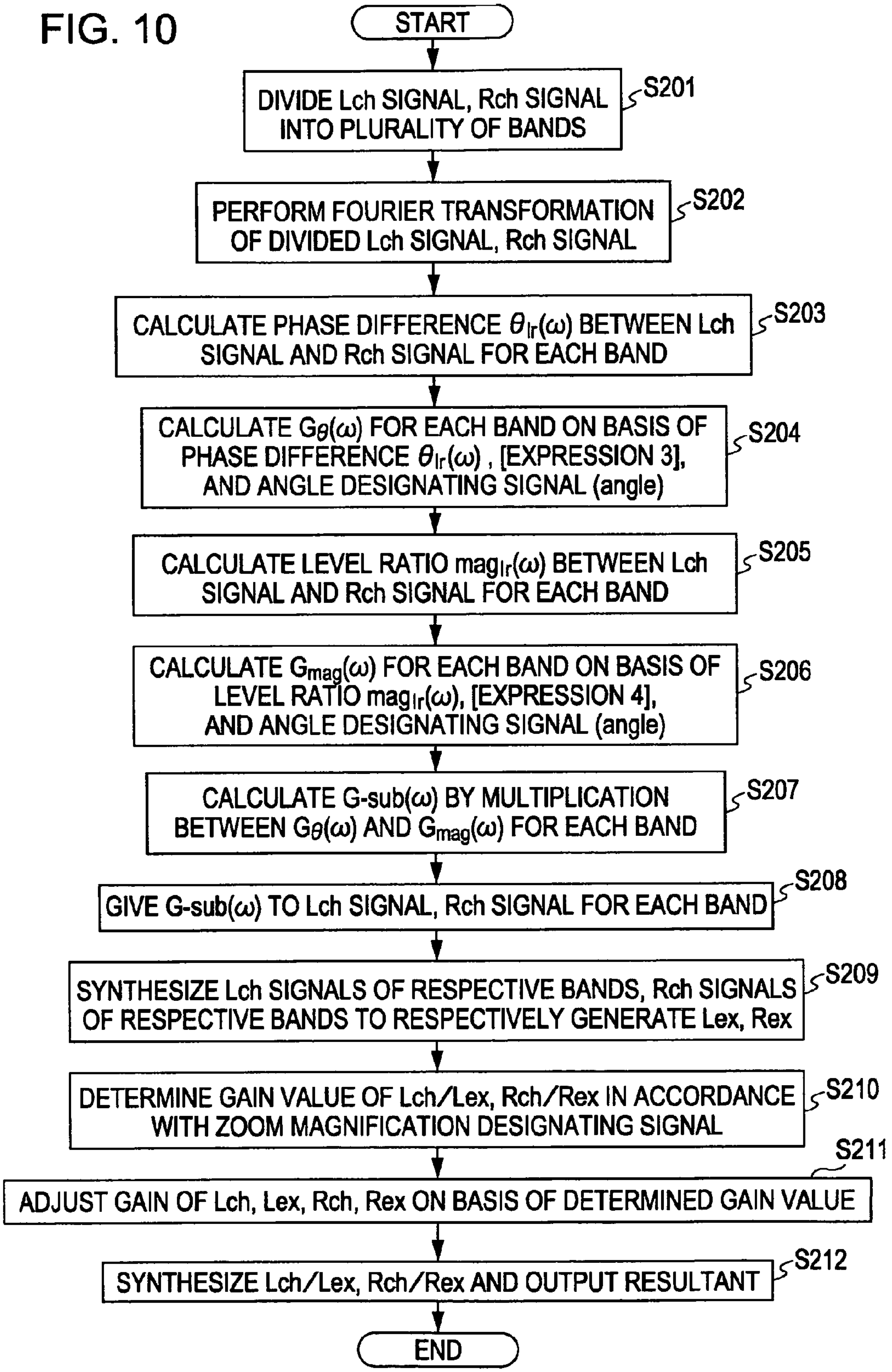
FIG. 10 is a flow chart showing the procedures of gain adjusting operation according to the second embodiment.

FIG. 10 shows the operations realized by the configurations of FIGS. 8 and 9 in the form of a flow chart.

It should be noted that in FIG. 10, like the operation according to steps S101 to S109 mentioned above with reference to FIG. 7, the operation according to steps S201 to S209 corresponds to the operation for extracting a sound source localized at an angle designated by the angle designating signal. Accordingly, the operation according to steps S201 to S209 will not be described again here, and the following description will only focus on steps S210 to S213.

First, in step S210, the gain values of Lch/Lex and Rch/Rex are determined in accordance with the zoom magnification designating signal. That is, this operation corresponds to the operation in which the gain adjusting circuit 39L and the gain adjusting circuit 39R shown in FIG. 9 determine the gain values in accordance with the zoom magnification designating signal, with respect to the audio signal Lex from the synthesis filter bank 14L or the Lch signal from the media reproduction section 32, and the audio signal Rex from the synthesis filter bank 14R or the Rch signal from the media reproduction section 32, respectively.

Then, in step S211, on the basis of the determined gain values, the gains of the Lch signal, audio signal Lex, Rch signal, and audio signal Rex are adjusted. That is, the gain adjusting circuit 39L adjusts the gain of the Lch signal or audio signal Lex, and the gain adjusting circuit 39R adjusts the Rch signal or the audio signal Rex.

Then, in step S212, the Lch signal/audio signal Lex, and the Rch signal/audio signal Rex are synthesized for output. That is, the gain adjusting circuit 39L synthesizes the Lch signal/audio signal Lex for output, and the gain adjusting circuit 39R synthesizes the Rch signal/audio signal Rex for output.

In this regard, as described above with reference to FIG. 9, as the gain adjustment according to the zoom amplification designating signal in each gain adjusting circuit 39, the gain on the audio signal Lex and audio signal Rex side is raised, or the gain on the Lch signal and Rch signal side is lowered in response to the zoom-in. Further, in response to the zoom-out, the gain on the audio signal Lex and audio signal Rex side is lowered, or the gain on the Lch signal and Rch signal side is raised.

For example, when performing the former adjustment, that is, the adjustment of raising the gain on the audio signal Lex/Rex side in response to the zoom-in, the adjustment is performed so that the sound volume of the audio signal Lex/Rex becomes larger than a set sound volume. This may prove problematic in that the sound volume set by the user is no longer adhered to.

To cope with this problem, the latter adjustment, that is, the adjustment of lowering the gain on the Lch signal/Rch signal side in response to the zoom-in operation may be performed.

However, with regard to the actual auditory sensation, when adjustment is performed on only one of the audio signal Lex/Rex side and the Lch signal Lch/Rch side as in the above-mentioned adjustment method, the equilibrium with the original set sound volume may not be attained as the sound volume as a whole. In this respect, the possibility of making the user feel a sense of incongruity may not be completely eliminated.

In view of this, when taking this into consideration or the like, it is also possible to adjust the gains of both the audio signal Lex/Rex side and Lch signal/Rch signal side in a comprehensive manner.

It should be noted that while in the above-described second embodiment as well the description is directed to the case where the sound source extracting operation is realized by the hardware configuration of the audio signal processing section 33, a part or the entirely of this operation can be realized by software processing. In that case, the audio signal processing section 33 may be configured by a microcomputer or the like that operates in accordance with a program for executing the corresponding processing shown in FIG. 10. In this case, the audio signal processing section 33 includes a recording medium such as a ROM, into which the above-mentioned program is recorded.

<Third Embodiment>

A third embodiment of the present invention is an application of the above-described first embodiment, whereby the gain adjustment of a localized sound source can be performed for each individual localization angle range set in advance.

It should be noted that the overall configuration of a reproducing apparatus according to the third embodiment is the same as that of the reproducing apparatus 1 shown in FIG. 1 mentioned above. That is, the reproducing apparatus can perform reproduction only with respect to an audio signal recorded in the recording medium.

Figure 11:
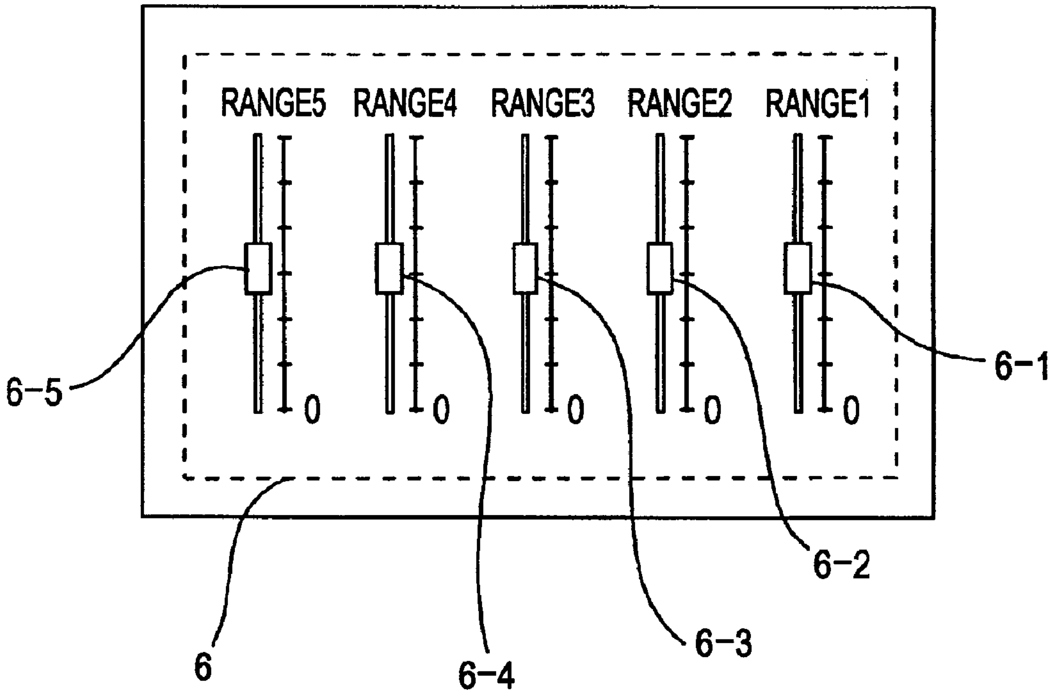
FIG. 11 is an exterior view showing operators included in an operation section of the reproducing apparatus according to a third embodiment of the present invention.

The reproducing apparatus in this case includes knob operators 6-1, 6-2, 6-3, 6-4, and 6-5 as shown in FIG. 11 below provided on the operation section 6 shown in FIG. 1.

The knob operators 6-1, 6-2, 6-3, 6-4, and 6-5 each serve as an operator for adjusting the gain (sound volume) with respect to a sound source localized within the corresponding localization angle.

In the third embodiment, when audio signals of a plurality of systems (that is, an Lch signal and an Rch signal in this case) are output from a speaker, the angle range within which the sound source can be localized (in this case, 360°° as an example) is divided into 5 ranges of equal intervals.

That is, in this case, with the front as seen from a listener taken as 0° (center), the angle range is divided into the ranges of 180° to 108°, 108° to 36°, 36° to −36°, −36° to −108°, and −108° to −180°. These ranges of localization angle are herein referred to as the localization angle ranges.

In this case, of the divided 5 localization angle ranges, the range of 180° to 108° is defined as Localization Angle Range 1, and the range of 108° to 36° is referred to as Localization Angle Range 2. Likewise, the succeeding ranges of 36° to −36°, −36° to −108°, and −108° to −180° are defined as Localization Angle Range 3, Localization Angle Range 4, and Localization Angle Range 5, respectively.

In FIG. 11, the knob operator 6-1 serves as an operator for adjusting the gain with respect to a sound source localized in Localization Angle Range 1. Further, likewise, the operator 6-2, the operator 6-3, the operator 6-4, and the operator 6-5 serve as the operators for adjusting the gain with respect to sound sources localized in Localization Angle Range 2, Localization Angle Range 3, Localization Angle Range 4, and Localization Angle Range 5, respectively.

Figure 12:
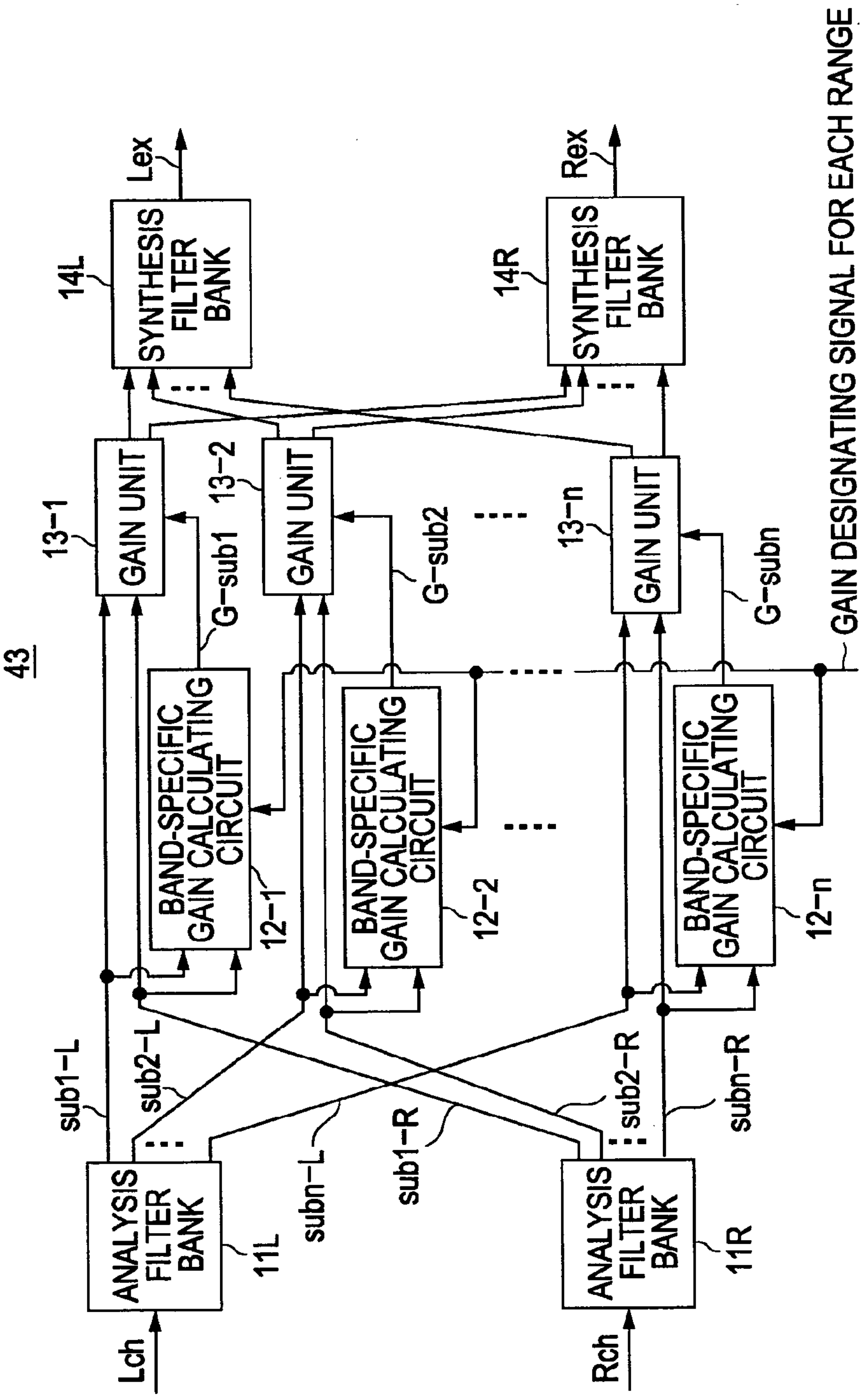
FIG. 12 is a block diagram showing the internal configuration of the audio signal processing apparatus according to the third embodiment.

Although not shown, each operation information corresponding to operation by each of the knob operators 6-1 to 6-5 is input to the system controller 5 and converted into a gain designating signal for each individual range. As shown in FIG. 12 below as well, such a gain designating signal for each individual range is supplied to each of the band-specific gain calculating circuits 12-1 to 12-n within an audio signal processing section 43.

It should be noted that while the knob operators 6-1 to 6-5 are provided in the operation section 6, the knob operators 6-1 to 6-5 may be provided in the remote commander 10.

Further, while the localization angle range is divided into equal intervals, the localization angle may be divided into unequal intervals. Further, while the number of localization angle ranges is set as 5, the number of divided localization angle ranges may be other than 5.

FIG. 12 shows the internal configuration of the audio signal processing section 43 in the reproducing apparatus according to the third embodiment. It should be noted that in FIG. 12 as well, the portions that have been already described above with reference to FIG. 3 are denoted by the same reference numerals and description thereof is omitted.

As described above, in the reproducing apparatus in this case, the operation information corresponding to operation by each of the knob operators 6-1 to 6-5 is input to the system controller 5 and converted into a gain designating signal for each individual range, which is then supplied to each of the band-specific gain calculating circuits 12-1 to 12-n as illustrated in the drawing.

On the basis of the gain designating signal for each individual range thus input, the sub-band signal sub-L from the analysis filter bank 11L, and the sub-band signal sub-R from the analysis filter bank 11R, each band-specific gain calculating circuit 12 calculates the gain G-sub that is to be set for each of the sub-band signal sub-L and sub-band signal sub-R of a corresponding band in the gain unit 13 on the downstream side.

Figure 13:
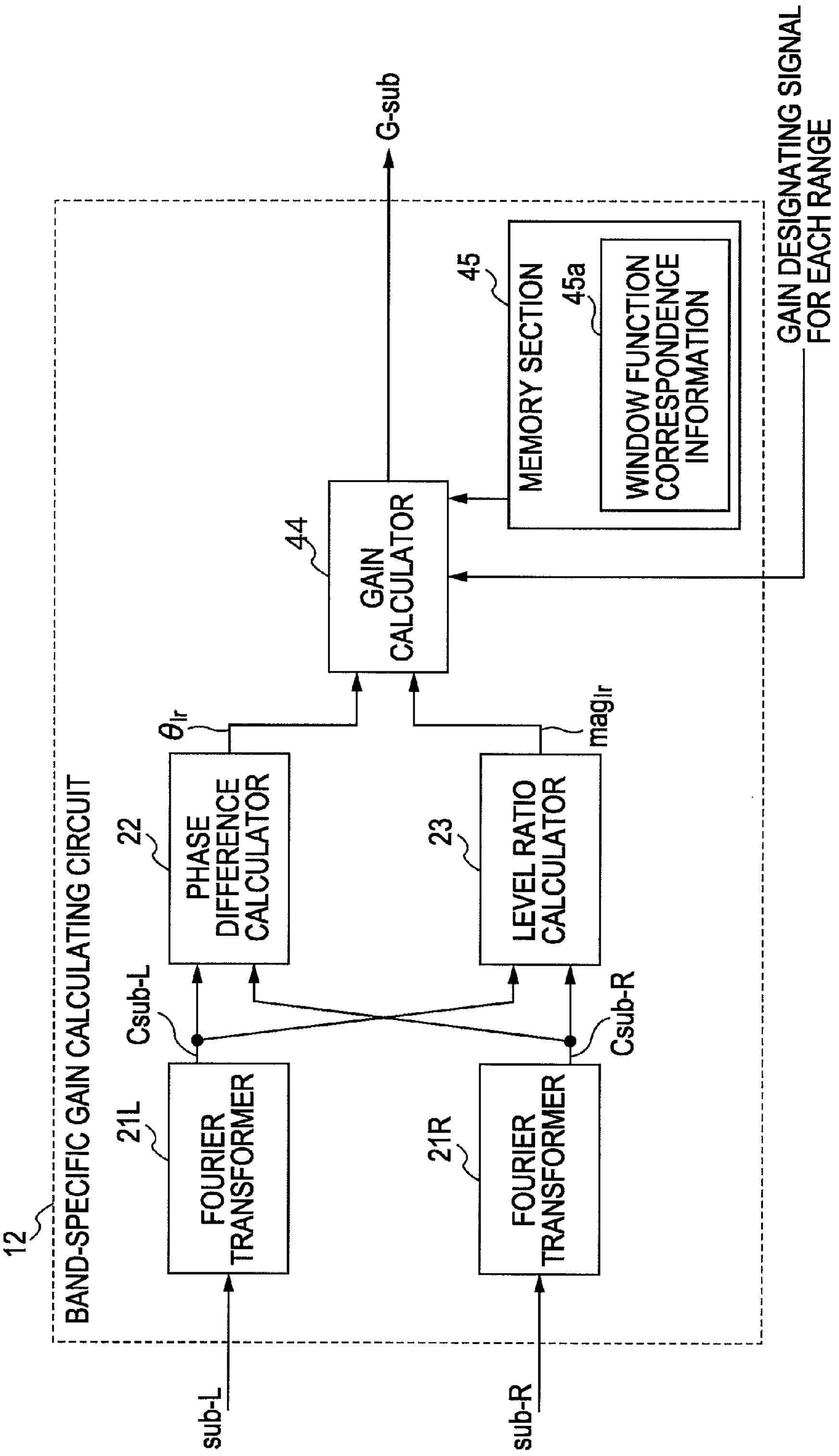
FIG. 13 is a block diagram showing the internal configuration of a band-specific gain calculating circuit included in the audio signal processing apparatus according to the third embodiment.

The internal configuration of each band-specific gain calculating circuit 12 in this case is as shown in FIG. 13 below.

It should be noted that in FIG. 13 as well, the portions that have been already described with reference to FIG. 4 above are denoted by the same reference numerals and description thereof will be omitted.

The band-specific gain calculating circuit 12 in this case is provided with a gain calculator 44 instead of the gain calculator 24 provided in the band-specific gain calculating circuit 12 shown in FIG. 4 mentioned above. The phase difference signal $\theta_{lr}$ from the phase difference calculator 22, and the level ratio signal $mag_{lr}$ from the level ratio calculator 23 are input to the gain calculator 44 in this case as well. Further, the gain designating signal for each individual range from the system controller 5 is input to the gain calculator 44.

The gain calculator 44 is provided with a memory section 45 illustrated in the drawing. The memory section 45 is configured as a storage device such as a ROM, for example, in which window function association information 45*a* is stored.

The window function correspondence information 45*a* refers to information in which a predetermined corresponding window function is associated with each one of gain combinations for each of the individual localization angle ranges that can be designated by the gain designating signal for each individual range. In this case as well, since the final gain value G-sub(ω) is obtained through multiplication between the phase difference gain $G_\theta(\omega)$ and the level ratio gain $G_{mag}(\omega)$, as the window function for this, there are prepared two kinds of window functions, that is, a function expressing the phase difference gain $G_\theta(\omega)$ with the value of the phase difference signal $\theta_{lr}$ ($\theta_{lr}(\omega)$) as a variable, and a function expressing the level ratio gain $G_{mag}(\omega)$ with the value of the level ratio $mag_{lr}$ ($mag_{lr}(\omega)$) as a variable.

That is, the window function correspondence information 45*a* includes information in which a predetermined corresponding phase difference window function is associated with each one of gain combinations for each of the individual localization angle ranges that can be designated by the gain designating signal for each individual range, and information in which a predetermined corresponding level ratio window function is associated with each one of gain combinations for each of the individual localization angle ranges that can be designated by the gain designating signal for each individual range.

Such window function correspondence information 45*a* will be described later again with reference to FIGS. 14, 15.

On the basis of the gain designating signal for each individual range from the system controller 5, the gain calculator 44 reads out the corresponding phase difference window function from the above-mentioned window function correspondence information 45*a*, and performs computation based on this phase difference window function and the phase difference $\theta_{lr}(\omega)$ from the phase difference calculator 22, thereby calculating the phase difference gain $G_\theta(\omega)$ according to the corresponding frequency band.

Further, at the same time, on the basis of the gain designating signal for each individual range, the gain calculator 44 reads out the corresponding level ratio window function from the above-mentioned window function correspondence information 45*a*, and performs computation based on this level ratio window function and the level ratio $mag_{lr}(\omega)$ from the level ratio calculator 23, thereby calculating the level ratio gain $G_{mag}(\omega)$ according to the corresponding frequency band.

Then, in the gain calculator 44 in this case as well, the gain value G-sub(ω) is calculated by performing computation as follows:

$$G\text{-sub}(\omega)=G_\theta(\omega)\times G_{mag}(\omega)$$

In this way, the gains G-sub (G-sub1 to G-subn) to be set for individual frequency bands are calculated in the respective band-specific gain calculating circuits 12 (12-1 to 12-n). As illustrated in FIG. 12 mentioned above, each of the gains G-sub1 to G-subn is input to one of the gain units 13-1 to 13-n with corresponding one of subscripts attached, and then given to each of the sub-band signal sub-L and sub-band signal sub-R.

Figure 14A:
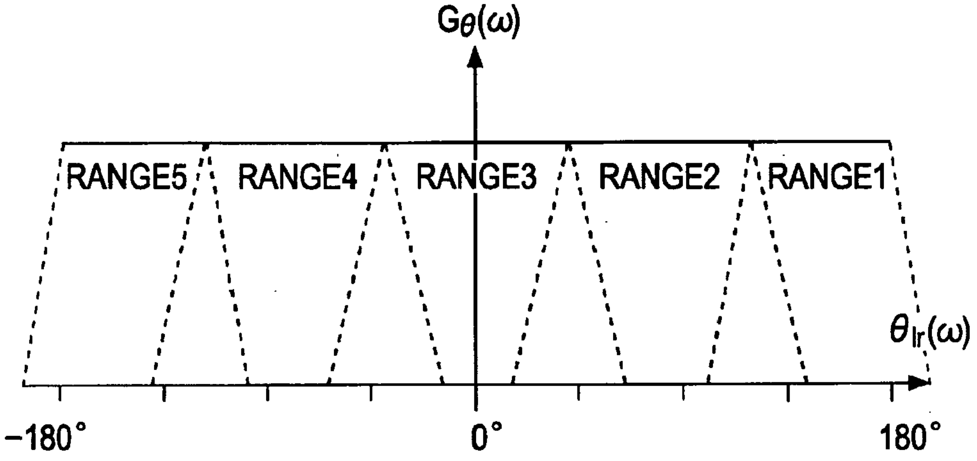
FIGS. 14A and 14B are diagrams each showing an example of a window function set in accordance with the case where the values of the gain designating signal for each individual range are the same.
Figure 14B:
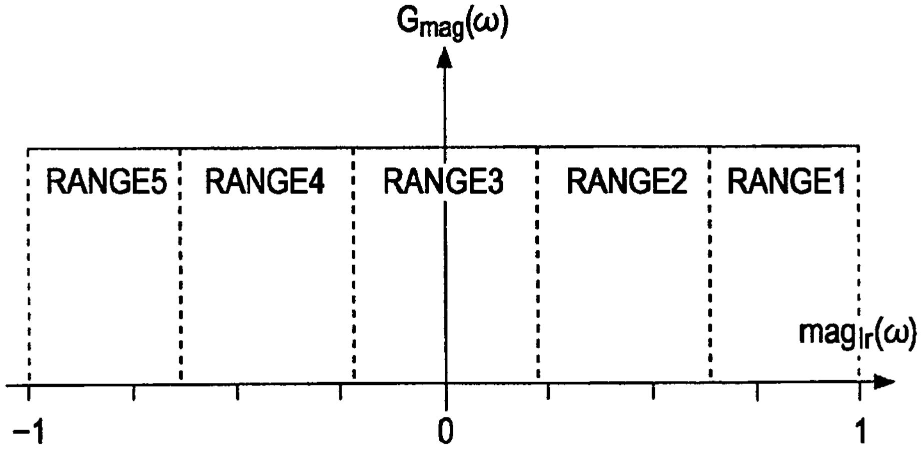
Figure 15A:
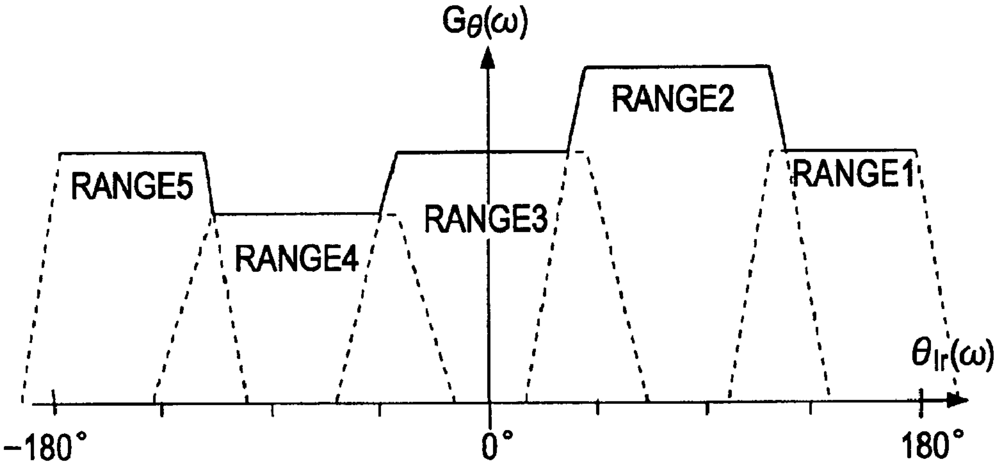
FIGS. 15A and 15B are diagrams each showing an example of a window function set in accordance with the case where the values of the gain designating signal for each individual range are different.
Figure 15B:
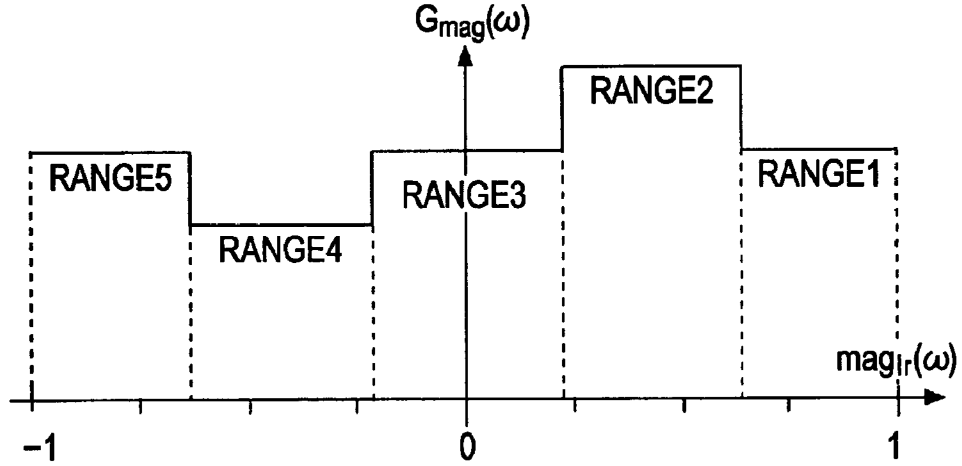

FIGS. 14A, 14B, 15A, and 15B are diagrams for explaining the above-described phase difference window function and level ratio window function. FIGS. 14A and 15A each illustrate in the form of a graph the characteristics of the phase difference gain $G_\theta(\omega)$ (that is, the phase difference window function) with the phase difference $\theta_{lr}(\omega)$ taken along the horizontal axis and the phase difference gain $G_\theta(\omega)$ taken along the vertical axis. FIGS. 14B and 15B each illustrate in the form of a graph the characteristics of the level ratio gain $G_{mag}(\omega)$ (that is, the level ratio window function) with the level ratio $mag_{lr}(\omega)$ taken along the horizontal axis and the level ratio gain $G_{mag}(\omega)$ taken along the vertical axis.

First, FIGS. 14A and 14B shows an example of a window function that is set in accordance with the case where the same gain value is designated with respect to all of Localization Angle Ranges 1 to 5 by the gain designating signals for individual ranges.

As shown in FIGS. 14A and 14B, in the case where the same value is designated as the gain for all of the localization angle ranges, such a function according to which a constant gain value is always attained irrespective of the values of the input phase difference $\theta_{lr}(\omega)$ and the level ratio $mag_{lr}(\omega)$ is defined.

Further, FIGS. 15A and 15B shows an example of a window function that is set in accordance with the case where different gains are designated with respect to Localization Angle Ranges 1 to 5 by the gain designating signals for individual ranges.

These window functions (the phase difference window function and the level ratio window function) are set so that, on the basis of the results of an auditory sensation experiment or the like, for example, the sound source localized in each localization range can be output at the designated gain (sound volume).

Then, the window function as described above is previously determined with respect to each one of gain combinations for individual localization angle ranges that can be designated by gain designating signals for individual ranges. The above-mentioned window function correspondence information 45*a* is created by associating each one of the gain combinations for individual localization angle ranges that can be designated by gain designating signals for individual ranges as described above, with the window function defined individually for each of the gain combinations.

Due to the window function correspondence information 45*a* as described above, on the basis of the value of a gain designating signal for each individual range input as described above, the gain calculator 44 can select the corresponding suitable phase difference window function and level ratio window function. That is, each of the phase difference window function and level ratio function selected by the gain calculator 44 is a window function set so that the sound sources localized in respective localization angle ranges can be output at the gains (sound volumes) designated by the gain designating signals for the individual ranges.

Then, on the basis of the window function thus selected in a suitable manner, in the gain calculator 44, the suitable gain values $G_\theta(\omega)$ and $G_{mag}(\omega)$ to be set for the corresponding frequency band are determined from the phase difference $\theta_{lr}(\omega)$ and the level ratio $mag_{lr}(\omega)$.

As described above, the gain values $G_\theta(\omega)$ and $G_{mag}(\omega)$ are multiplied with each other in the gain calculator 44, and the resultant is given as the gain G-sub to each of the corresponding sub-band signal sub-L and sub-band signal sub-R in each gain unit 13. Accordingly, each of the audio signal Lex and audio signal Rex obtained by synthesis in the synthesis filter bank 14L and the synthesis filter bank 14R is one that can make a sound source localized in each localization angle range have a gain (sound volume) designated by the gain designating signal for each individual range.

That is, the gain of the sound source localized in each localization angle range can be thus adjusted by means of the gain designated by the gain designating signal for each individual range.

Here, assuming that, for example, the sound sources of a guitar, bass, vocal, drum, and keyboards are localized in Localization Angle Range 1, Localization Angle Range 2, Localization Angle Range 3, Localization Angle Range 4, and Localization Angle Range 5, respectively, according to the third embodiment as described above, the user can freely adjust the sound volume of each of these respective parts. That is, the user can freely and manually make such designations as to extract or remove only the sound source localized at a given localization angle such as, for example, extracting only the sound of the guitar or removing the sound of the vocal.

Figure 16:
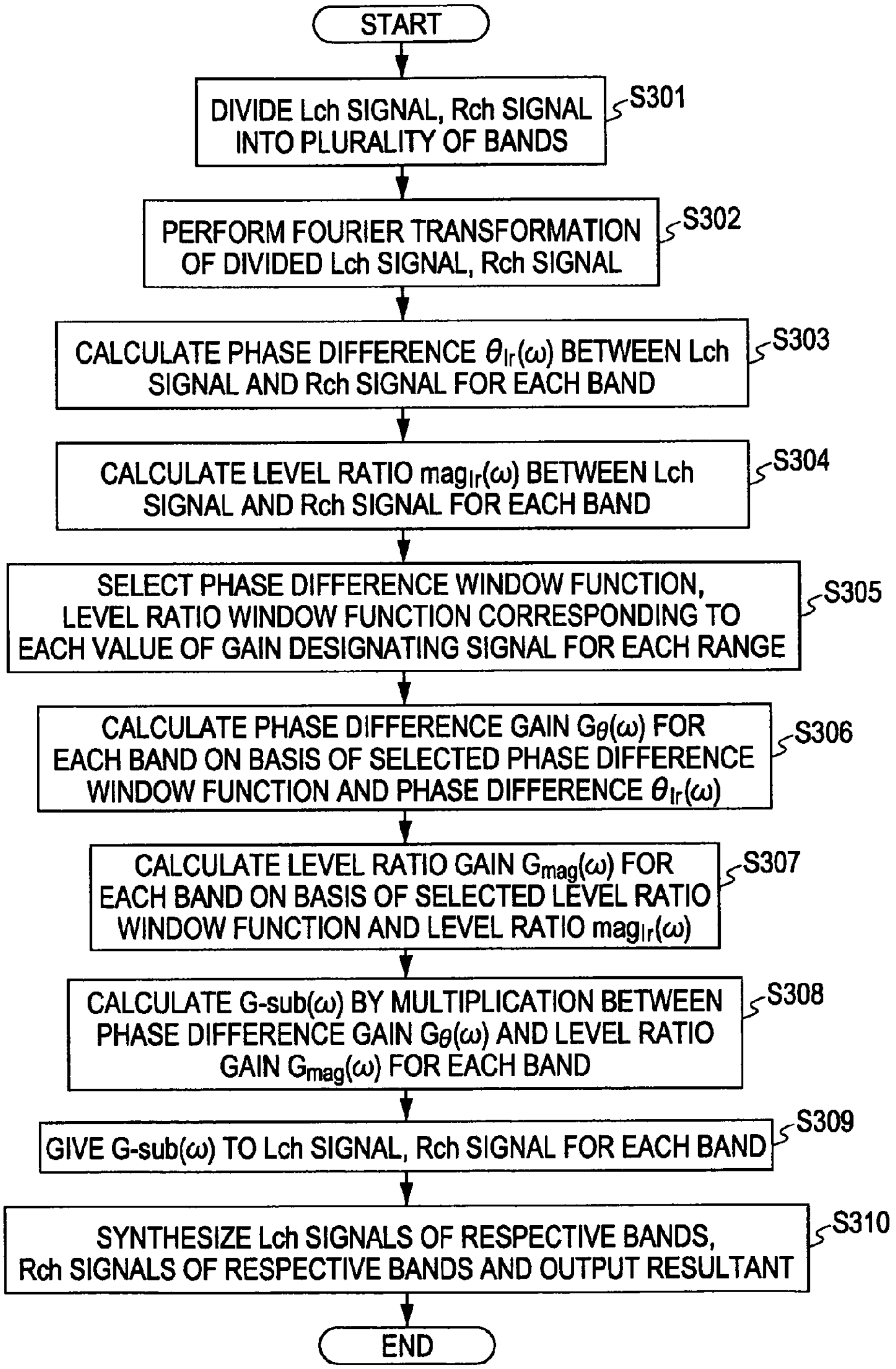
FIG. 16 is a flow chart showing the procedures of adjustment operation in the case where the gain value is calculated using a window function, as gain adjusting operation according to the third embodiment.

FIG. 16 is a flowchart showing the procedures of gain adjustment operation for each individual localization angle range described above.

First, in steps S301 to S304, through the same operations as those in steps S101 to S103, and S105 shown in FIG. 7 mentioned above, the band division and Fourier transformation of the Lch signal and Rch signal, and the calculation of the phase difference $\theta_{lr}(\omega)$ and level ratio $mag_{lr}(\omega)$ for each individual band are performed.

Then, in step S305, the selection of the phase difference window function and level ratio window function according to the respective values of the gain designating signal for each individual range is performed. That is, in accordance with the respective values of the gain designating signal for each individual range input from the system controller 5, the gain calculator 44 in each band-specific gain calculating circuit 12 selects the corresponding phase difference window function and level ratio window function from the window function corresponding information 45*a* in the memory section 45.

In step S306 that follows, the phase difference gain $G_\theta(\omega)$ is calculated for each individual band on the basis of the selected phase difference window function and the phase difference $\theta_{lr}(\omega)$. That is, the gain calculator 44 in each band-specific gain calculating circuit 12 substitutes the phase difference $\theta_{lr}(\omega)$ from the phase difference calculator 22 into the selected phase difference window function and solves this function to thereby calculate the phase difference gain $G_\theta(\omega)$.

Further, in step S307, the level ratio gain $G_{mag}(\omega)$ is calculated for each individual band on the basis of the selected level ratio window function and the level ratio $mag_{lr}(\omega)$. That is, the gain calculator 44 in each band-specific gain calculating circuit 12 substitutes the level ratio $mag_{lr}(\omega)$ from the level ratio calculator 23 into the selected level ratio window function and solves this function to thereby calculate the level ratio gain $G_{mag}(\omega)$.

It should be noted that in this case as well, for the convenience of description, the calculation of the phase difference $\theta_{lr}(\omega)$/phase difference gain $G_\theta(\omega)$ and the calculation of the level ratio $mag_{lr}(\omega)$/level ratio gain $G_{mag}(\omega)$ are carried out one after the other. However, in actuality, these calculations are carried out simultaneously and in parallel.

In steps S308 to S310 that follow, in the same manner as in steps S107 to S109 of FIG. 7 mentioned above, the gain calculator 44 multiplies the phase difference gain $G_\theta(\omega)$ and the level ratio gain $G_{mag}(\omega)$ for each individual band to calculate the gain value G-sub(ω). Further, for each individual band, the gain unit 13 gives the calculated gain value G-sub (ω) to each of the Lch signal and Rch signal, and then the synthesis filter bank 14L and the synthesis filter bank 14R synthesize the Lch signals of respective bands and the Rch signals of respective bands, respectively, and output the resultant.

Accordingly, the audio signal Lex and the audio signal Rch, which can make a sound source localized in each localization angle range to have a gain (sound volume) designated by the gain designating signal for each individual range, are output.

It should be noted that while the above description is directed to the case where the gain adjusting operation for each individual localization angle range is also realized by the hardware configuration of the audio signal processing section 33, a part or the entirely of this operation can be realized by software processing. In that case, the audio signal processing section 33 may be configured by a microcomputer or the like that operates in accordance with a program for executing the corresponding processing shown in FIG. 16. In this case, the audio signal processing section 33 includes a recording medium such as a ROM, into which the above-mentioned program is recorded.

Incidentally, in the foregoing description, in order to enable the gain adjustment for each individual localization angle range according to the third embodiment, the gain value G-sub to be set for each band is determined by using a window function with only the phase difference $\theta_{lr}(\omega)$ and the level ratio $mag_{lr}(\omega)$ serving as variables. However, alternatively, the gain value G-sub may be obtained by using a function in which the phase difference gain $G_\theta(\omega)$ and the respective values of the gain designating signal for individual ranges, and the level ratio gain $G_{mag}(\omega)$ and the respective values of the gain designating signal for individual ranges serve as variables.

As the specific method for achieving this, first, the value (in this case, 180° to −180°) that can be taken by the phase difference $\theta_{lr}(\omega)$, and the value (in this case, 1 to −1) that can be taken by the level ratio $\theta_{mag}(\omega)$ are divided (in five in this case) in accordance with the number of localization angle ranges, and the phase difference gain $G_\theta(\omega)$ and the level ratio gain $G_{mag}(\omega)$ are calculated for each of these individual divided ranges using independent functions. Then, the values of the phase difference gain $G_\theta(\omega)$ and level ratio gain $G_{mag}(\omega)$ independently determined for these individual ranges are multiplied by the gain value of each range designated by the gain designating signal for each individual range, thereby calculating the phase difference gain $G_\theta(\omega)$ and the level ratio gain $G_{mag}(\omega)$ for making the sound source localized in each localization angle range have a gain (sound volume) designated by the gain designating signal for each individual range.

Then, for each individual band, the phase difference gain $G_\theta(\omega)$ and the level ratio gain $G_{mag}(\omega)$ calculated in this way are multiplied with each other to obtain the final gain value G-sub(ω).

Here, the thresholds set for dividing the phase difference $\theta_{lr}(\omega)$ in accordance with Localization Angle Ranges 1 to 5 are defined as $T_0$, $T_1$, $T_2$, $T_3$, $T_4$, and $T_5$ in this order from the 180° side. Further, the phase difference gains $G_\theta(\omega)$ determined for individual localization angle ranges are defined as $G_{\theta1}(\omega)$, $G_{\theta2}(\omega)$, $G_{\theta3}(\omega)$, $G_{\theta4}(\omega)$, and $G_{\theta5}(\omega)$ in this order from the Range 1 side. Furthermore, the gain values for individual localization angle ranges designated by the gain designating signals for individual ranges are defined as $G_{set1}$, $G_{set2}$, $G_{set3}$, $G_{set4}$, and $G_{set5}$ in this order from the Range 1 side.

In this case, the above-described determination of the phase difference gain $G_\theta(\omega)$ by multiplying the value of the phase difference gain, which is independently determined for each individual range, by the gain value of each range designated by the gain designating signal for each individual range, can be expressed by [Expression 5] below.

[Expression 5]

$$G_\theta(\omega)=\begin{cases} G_{set1}\times G_{\theta1}(\omega) & \leftarrow (\theta_l(\omega)>T_1) \\ G_{set2}\times G_{\theta2}(\omega) & \leftarrow (T_1\geq\theta_{lr}(\omega)>T_2) \\ G_{set3}\times G_{\theta3}(\omega) & \leftarrow (T_2\geq\theta_{lr}(\omega)>T_3) \\ G_{set4}\times G_{\theta4}(\omega) & \leftarrow (T_3\geq\theta_{lr}(\omega)>T_4) \\ G_{set5}\times G_{\theta5}(\omega) & \leftarrow (T_4\geq\theta_{lr}(\omega)) \end{cases}$$

Further, likewise, with regard to the level ratio gain $G_{mag}(\omega)$ the thresholds set for dividing the level ratio $mag_{lr}(\omega)$ in accordance with Localization Angle Ranges 1 to 5 are defined as $T_0/180$, $T_1/180$, $T_2/180$, $T_3/180$, $T_4/180$, and $T_5/180$ in this order from the "1" side. Further, the level ratio gains $G_{mag}(\omega)$ determined for individual localization angle ranges are defined as $G_{mag1}(\omega)$, $G_{mag2}(\omega)$, $G_{mag3}(\omega)$, $G_{mag4}(\omega)$, and $G_{mag5}(\omega)$ in this order from the Range 1 side. Furthermore, the gain values for individual localization angle ranges designated by the gain designating signals for individual ranges are defined as $G_{set1}$, $G_{set2}$, $G_{set3}$, $G_{set4}$, and $G_{set5}$ in this order from the Range 1 side. In this case, the above-described determination of the level ratio gain $G_{mag}(\omega)$ by multiplying the value of the level ratio gain, which is independently determined for each individual range, by the gain value of each range designated by the gain designating signal for each individual range, can be expressed by [Expression 6] below.

[Expression 6]

$$G_{mag}(\omega)=\begin{cases} G_{set1}\times G_{mag1}(\omega) & \leftarrow (mag_{lr}(\omega)\times180>T_1) \\ G_{set2}\times G_{mag2}(\omega) & \leftarrow (T_1\geq mag_{lr}(\omega)\times180>T_2) \\ G_{set3}\times G_{mag3}(\omega) & \leftarrow (T_2\geq mag_{lr}(\omega)\times180>T_3) \\ G_{set4}\times G_{mag4}(\omega) & \leftarrow (T_3\geq mag_{lr}(\omega)\times180>T_4) \\ G_{set5}\times G_{mag5}(\omega) & \leftarrow (T_4\geq mag_{lr}(\omega)\times180) \end{cases}$$

Further, in this case, as described above, the phase difference gains $G_{\theta1}(\omega)$, $G_{\theta2}(\omega)$, $G_{\theta3}(\omega)$, $G_{\theta4}(\omega)$, and $G_{\theta5}(\omega)$ for the individual localization angle ranges are calculated by using the functions that are independently set for each of the individual localization angle ranges.

Specifically, assuming that the slopes of the left oblique lines of the gain windows for individual localization angle ranges are defined as $gradient_{\theta1L}$, $gradient_{\theta2L}$, $gradient_{\theta3L}$, $gradient_{\theta4L}$, and $gradient_{5L}$, the slopes of the right oblique lines of the gain windows for the individual localization angle ranges are defined as $gradient_{\theta1R}$, $gradient_{\theta2R}$, $gradient_{\theta3R}$, $gradient_{\theta4R}$, and $gradient_{\theta5R}$, and the widths of the upper sides of the gain windows for individual localization angle ranges divided by 2 are defined as $top\_width_{\theta1}$, $top\_width_{\theta2}$, $top\_width_{\theta3}$, $top\_width_{\theta4}$, and $top\_width_{\theta5}$, the phase difference gains $G_{\theta1}(\omega)$, $G_{\theta2}(\omega)$, $G_{\theta3}(\omega)$, $G_{\theta4}(\omega)$, and $G_{\theta5}(\omega)$ are determined by [Expression 7], [Expression 8], [Expression 9], [Expression 10], and [Expression 11] below.

It should be noted, however, that in [Expression 7] to [Expression 11] below, $0\leqq G_{\theta1}(\omega)\leqq1$, $0\leqq G_{\theta2}(\omega)\leqq1$, $0\leqq G_{\theta3}(\omega)\leqq1$, $0\leqq G_{\theta4}(\omega)\leqq1$, and $0\leqq G_{\theta5}(\omega)\leqq1$.

[Expression 7]

$(\theta_{lr}(\omega)>(T_0+T_1)/2+\text{top\_width}_{\theta1})$ $((T_0+T_1)/2-\text{top\_width}_{\theta1}\leq\theta_{lr}(\omega)\leq(T_0+T_1)/2+\text{top\_width}_{\theta1})$ $(T_1<\theta_{lr}(\omega)<(T_0+T_1)/2-\text{top\_width}_{\theta1})$ $$G_{\theta1}(\omega)=\begin{cases} 1+\dfrac{(T_0+T_1)/2+\text{top\_width}_{\theta1}-\theta_{lr}(\omega)}{gradient_{\theta1R}} & (1) \\ 1 & (2) \\ 1-\dfrac{(T_0+T_1)/2-\text{top\_width}_{\theta1}-\theta_{lr}(\omega)}{gradient_{\theta1L}} & (3) \end{cases}$$

[Expression 8]

$(T_1\geq\theta_{lr}(\omega)>(T_1+T_2)/2+\text{top\_width}_{\theta2})$ $((T_1+T_2)/2-\text{top\_width}_{\theta2}\leq\theta_{lr}(\omega)\leq(T_1+T_2)/2+\text{top\_width}_{\theta2})$ $(T_2<\theta_{lr}(\omega)<(T_1+T_2)/2-\text{top\_width}_{\theta2})$ $$G_{\theta2}(\omega)=\begin{cases} 1+\dfrac{(T_1+T_2)/2+\text{top\_width}_{\theta2}-\theta_{lr}(\omega)}{gradient_{\theta2R}} & (1) \\ 1 & (2) \\ 1-\dfrac{(T_1+T_2)/2-\text{top\_width}_{\theta2}-\theta_{lr}(\omega)}{gradient_{\theta2L}} & (3) \end{cases}$$

[Expression 9]

$(T_2\geq\theta_{lr}(\omega)>(T_2+T_3)/2+\text{top\_width}_{\theta3})$ $((T_2+T_3)/2-\text{top\_width}_{\theta3}\leq\theta_{lr}(\omega)\leq(T_2+T_3)/2+\text{top\_width}_{\theta3})$ $(T_3<\theta_{lr}(\omega)<(T_2+T_3)/2-\text{top\_width}_{\theta3})$ $$G_{\theta3}(\omega)=\begin{cases} 1+\dfrac{(T_2+T_3)/2+\text{top\_width}_{\theta3}-\theta_{lr}(\omega)}{gradient_{\theta3R}} & (1) \\ 1 & (2) \\ 1-\dfrac{(T_2+T_3)/2-\text{top\_width}_{\theta3}-\theta_{lr}(\omega)}{gradient_{\theta2L}} & (3) \end{cases}$$

-continued

[Expression 10]

$$(T_3 \geq \theta_{lr}(\omega) > (T_3+T_4)/2+\text{top\_width}_{\theta 4})$$
$$((T_3+T_4)/2-\text{top\_width}_{\theta 4} \leq \theta_{lr}(\omega) \leq (T_3+T_4)/2+\text{top\_width}_{\theta 4})$$
$$(T_4 < \theta_{lr}(\omega) < (T_3+T_4)/2-\text{top\_width}_{\theta 4})$$

$$G_{\theta 3}(\omega)=\begin{cases} 1+\dfrac{(T_3+T_4)/2+\text{top\_width}_{\theta 4}-\theta_{lr}(\omega)}{gradient_{\theta 4R}} & (1)\\ 1 & (2)\\ 1-\dfrac{(T_3+T_4)/2-\text{top\_width}_{\theta 4}-\theta_{lr}(\omega)}{gradient_{\theta 4L}} & (3)\end{cases}$$

[Expression 11]

$$(T_4 \geq \theta_{lr}(\omega) > (T_4+T_5)/2+\text{top\_width}_{\theta 5})$$
$$((T_4+T_5)/2-\text{top\_width}_{\theta 5} \leq \theta_{lr}(\omega) \leq (T_4+T_5)/2+\text{top\_width}_{\theta 5})$$
$$(\theta_{lr}(\omega) < (T_4+T_5)/2-\text{top\_width}_{\theta 5})$$

$$G_{\theta 5}(\omega)=\begin{cases} 1+\dfrac{(T_4+T_5)/2+\text{top\_width}_{\theta 5}-\theta_{lr}(\omega)}{gradient_{\theta 5R}} & (1)\\ 1 & (2)\\ 1-\dfrac{(T_3+T_4)/2-\text{top\_width}_{\theta 5}-\theta_{lr}(\omega)}{gradient_{\theta 5L}} & (3)\end{cases}$$

Further, according to the above description, the level ratio gains $G_{mag1}(\omega)$, $G_{mag2}(\omega)$, $G_{mag3}(\omega)$, $G_{mag4}(\omega)$, and $G_{mag5}(\omega)$ for the individual localization angle ranges are likewise calculated by using the functions that are independently set for the individual localization angle ranges.

That is, assuming that the slopes of the left oblique lines of the gain windows for individual localization angle ranges are defined as $gradient_{mag1L}$, $gradient_{mag2L}$, $gradient_{mag3L}$, $gradient_{mag4L}$, and $gradient_{mag5L}$, the slopes of the right oblique lines of the gain windows for individual localization angle ranges are defined as $gradient_{mag1R}$, $gradient_{mag2R}$, $gradient_{mag3R}$, $gradient_{mag4R}$, and $gradient_{mag5R}$, and the widths of the upper sides of the gain windows for individual localization angle ranges divided by 2 are defined as $\text{top\_width}_{mag1}$, $\text{top\_width}_{mag2}$, $\text{top\_width}_{mag3}$, $\text{top\_width}_{mag4}$, and $\text{top\_width}_{mag5}$, the level ratio gains $G_{mag1}(\omega)$, $G_{mag2}(\omega)$, $G_{mag3}(\omega)$, $G_{mag4}(\omega)$, and $G_{mag5}(\omega)$ are determined by [Expression 12], [Expression 13], [Expression 14], [Expression 15], and [Expression 16] below.

It should be noted, however, that in [Expression 12] to [Expression 16] below as well, $0 \leqq G_{mag1}(\omega) \leqq 1$, $0 \leqq G_{mag2}(\omega) \leqq 1$, $0 \leqq G_{mag3}(\omega) \leqq 1$, $0 \leqq G_{mag4}(\omega) \leqq 1$ and $0 \leqq G_{mag5}(\omega) \leqq 1$.

[Expression 12]

$$(mag_{lr}(\omega)\times 180 > (T_0+T_1)/2+\text{top\_width}_{mag1})$$
$$((T_0+T_1)/2-\text{top\_width}_{mag1} \leq mag_{lr}(\omega)\times 180 \leq (T_0+T_1)/2+\text{top\_width}_{mag1})$$
$$(T_3 < mag_{lr}(\omega)\times 180 < (T_0+T_1)/2-\text{top\_width}_{mag1})$$

$$G_{mag1}(\omega)=\begin{cases} 1+\dfrac{(T_0+T_1)/2+\text{top\_width}_{mag1}-mag_{lr}(\omega)\times 180}{gradient_{mag1R}} & (1)\\ 1 & (2)\\ 1-\dfrac{(T_0+T_1)/2-\text{top\_width}_{mag1}-mag_{lr}(\omega)\times 180}{gradient_{mag1L}} & (3)\end{cases}$$

[Expression 13]

$$(T_1 \geq mag_{lr}(\omega)\times 180 > (T_1+T_2)/2+\text{top\_width}_{mag2})$$
$$((T_1+T_2)/2-\text{top\_width}_{mag2} \leq mag_{lr}(\omega)\times 180 \leq (T_1+T_2)/2+\text{top\_width}_{mag2})$$
$$(T_2 < mag_{lr}(\omega)\times 180 < (T_1+T_2)/2-\text{top\_width}_{mag2})$$

$$G_{mag2}(\omega)=\begin{cases} 1+\dfrac{(T_1+T_2)/2+\text{top\_width}_{mag2}-mag_{lr}(\omega)\times 180}{gradient_{mag2R}} & (1)\\ 1 & (2)\\ 1-\dfrac{(T_1+T_2)/2-\text{top\_width}_{mag2}-mag_{lr}(\omega)\times 180}{gradient_{mag2L}} & (3)\end{cases}$$

[Expression 14]

$$(T_2 \geq mag_{lr}(\omega)\times 180 > (T_2+T_3)/2+\text{top\_width}_{mag3})$$
$$((T_2+T_3)/2-\text{top\_width}_{mag3} \leq mag_{lr}(\omega)\times 180 \leq (T_2+T_3)/2+\text{top\_width}_{mag3})$$
$$(T_3 < mag_{lr}(\omega)\times 180 < (T_2+T_3)/2-\text{top\_width}_{mag3})$$

$$G_{mag3}(\omega)=\begin{cases} 1+\dfrac{(T_2+T_3)/2+\text{top\_width}_{mag3}-mag_{lr}(\omega)\times 180}{gradient_{mag3R}} & (1)\\ 1 & (2)\\ 1-\dfrac{(T_2+T_3)/2-\text{top\_width}_{mag3}-mag_{lr}(\omega)\times 180}{gradient_{mag3L}} & (3)\end{cases}$$

[Expression 15]

$$(T_3 \geq mag_{lr}(\omega)\times 180 > (T_3+T_4)/2+\text{top\_width}_{mag4})$$
$$((T_3+T_4)/2-\text{top\_width}_{mag4} \leq mag_{lr}(\omega)\times 180 \leq (T_3+T_4)/2+\text{top\_width}_{mag4})$$
$$(T_4 < mag_{lr}(\omega)\times 180 < (T_3+T_4)/2-\text{top\_width}_{mag4})$$

$$G_{mag4}(\omega)=\begin{cases} 1+\dfrac{(T_3+T_4)/2+\text{top\_width}_{mag4}-mag_{lr}(\omega)\times 180}{gradient_{mag4R}} & (1)\\ 1 & (2)\\ 1-\dfrac{(T_3+T_4)/2-\text{top\_width}_{mag4}-mag_{lr}(\omega)\times 180}{gradient_{mag4L}} & (3)\end{cases}$$

[Expression 16]

$$(T_4 \geq mag_{lr}(\omega)\times 180 > (T_4+T_5)/2+\text{top\_width}_{mag5})$$
$$((T_4+T_5)/2-\text{top\_width}_{mag5} \leq mag_{lr}(\omega)\times 180 \leq (T_4+T_5)/2+\text{top\_width}_{mag5})$$
$$(mag_{lr}(\omega)\times 180 < (T_4+T_5)/2-\text{top\_width}_{mag5})$$

$$G_{mag5}(\omega)=\begin{cases} 1+\dfrac{(T_4+T_5)/2+\text{top\_width}_{mag5}-mag_{lr}(\omega)\times 180}{gradient_{mag5R}} & (1)\\ 1 & (2)\\ 1-\dfrac{(T_4+T_5)/2-\text{top\_width}_{mag5}-mag_{lr}(\omega)\times 180}{gradient_{mag5L}} & (3)\end{cases}$$

Here, the thresholds $T_0$ to $T_5$ are fixed values, and in the case of division into 5 equal parts as in this embodiment, $T_0=180°$, $T_1=108°$, $T_2=36°$, $T_3=-36°$, $T_4=-108°$, and $T5=-180°$.

Further, the respective values of $gradient_{\theta 1L}$ to $gradient_{\theta 5L}$, $gradient_{\theta 1R}$ to $gradient_{\theta 5R}$, $gradient_{mag1L}$ to $gradient_{mag5L}$, $gradient_{mag1R}$ to $gradient_{mag5R}$, $top\_width_{\theta 1}$ to $top\_width_{\theta 5}$, and $top\_width_{mag1}$ to $top\_width_{mag5}$, may be set as fixed values or values designated from the system controller 5 as appropriate. For example, in the case where these values are designated as appropriate from the system controller 5, the values may be selected so that the gain values are continuous at the boundary between the respective localization angle ranges.

Figure 17:
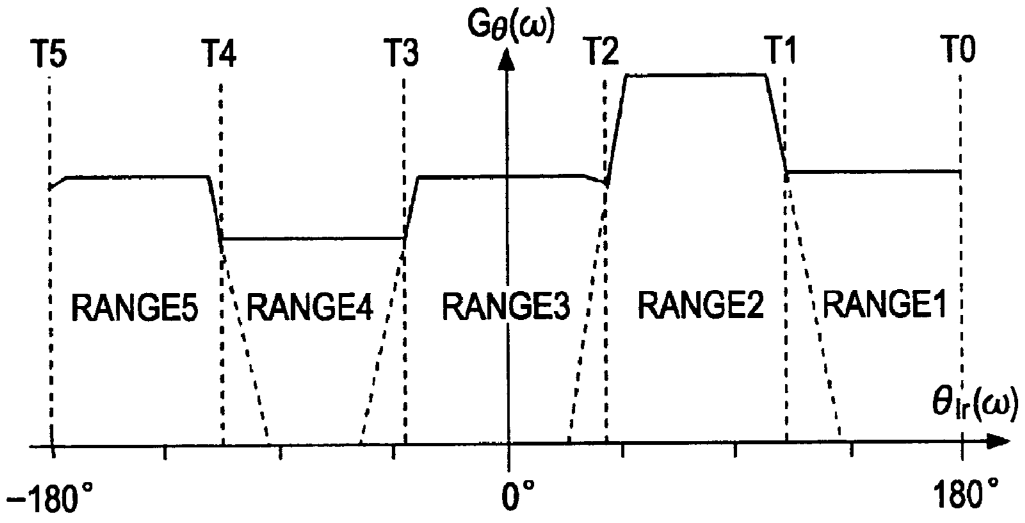
FIG. 17 is a diagram showing an example of the characteristics of a phase difference gain for each individual localization angle range set in the case where a function using the value of the gain designating signal for each individual range and a phase difference as variables is used for the calculation of a gain value according to the third embodiment.

Next, FIG. 17 shows in the form of a graph the characteristics of the phase difference gain $G_\theta(\omega)$ with the phase difference $\theta_{lr}(\omega)$ taken along the horizontal axis and the phase difference gain $G_\theta(\omega)$ taken along the vertical axis when, assuming that $gradient_{\theta 1L}=1$, $gradient_{\theta 2L}=26$ $gradient_{\theta 3L}=20$ $gradient_{\theta 4L}=1$, and $gradient_{\theta 5L}=180$, $gradient_{\theta 1R}=1$, $gradient_{\theta 2R}=26$ $gradient_{\theta 3R}=180$ $gradient_{\theta 4R}=1$, and $gradient_{\theta 5R}=20$, and further $top\_width_{\theta 1}=36°$, $top\_width_{\theta 2}=30°$, $top\_width_{\theta 3}=30°$, $top\_width_{\theta 4}=36°$, and $top\_width_{\theta 5}=30°$, the gains of the respective localization angle ranges are designated by the gain designating signals for individual ranges as follows: the gain $G_{set1}$ of Localization Angle Range 1=1.0; the gain $G_{set2}$ of Localization Angle Range 2=1.3; the gain $G_{set3}$ of Localization Angle Range 3=1.0; the gain $G_{set4}$ of Localization Angle Range 4=0.7; and the gain $G_{set5}$ of Localization Angle Range 5=1.0.

Figure 18:
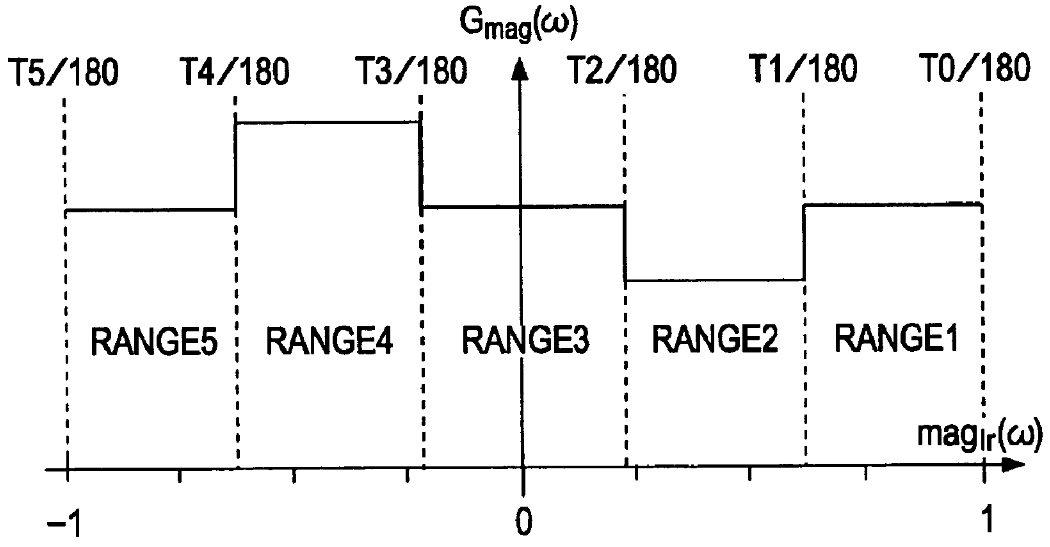
FIG. 18 is a diagram showing an example of the characteristics of a level ratio gain for each individual localization angle range set in the case where a function using the value of the gain designating signal for each individual range and a level ratio as variables is used for the calculation of a gain value according to the third embodiment.

Further, FIG. 18 shows in the form of a graph the characteristics of the level ratio gain $G_{mag}(\omega)$ with the level ratio $mag_{lr}(\omega)$ taken along the horizontal axis and the level ratio gain $G_{mag}(\omega)$ taken along the vertical axis when, in the case where $gradient_{mag1L}$ to $gradient_{mag5L}$ and $gradient_{mag1R}$ to $gradient_{mag5R}$ are all set as "1" and further $top\_width_{mag1}$ to $top\_width_{mag5}$ are all set as "36°", the gains of the respective localization angle ranges are designated by the gain designating signals for individual ranges as follows: the gain $G_{set1}$ of Localization Angle Range 1=1.0; the gain $G_{set2}$ of Localization Angle Range 2=0.7; the gain $G_{set3}$ of Localization Angle Range 3=1.0; the gain $G_{set4}$ of Localization Angle Range 4=1.3; and the gain $G_{set5}$ of Localization Angle Range 5=1.0.

First, in FIG. 17, since $top\_width_{\theta 1}$ and $top\_width_{\theta 4}$ are set as "36°", $gradient_{\theta 1L}$ and $gradient_{\theta 1R}$ are set as "1", and $gradient_{\theta 4L}$ and $gradient_{\theta 4R}$ are set as "1" in this case, a characteristic is obtained in which the phase difference gain $G_\theta(\omega)$ in each of Localization Angle Range 1 and Localization Angle Range 4 becomes flat over the entire region of the range. In this case, since the gain of Localization Angle Range 1=1.0 and the gain of Localization Angle Range 4=0.7, the phase difference gains $G_\theta(\omega)$ corresponding to the frequency bands (sub-band signals) for which the values of the phase difference $\theta_{lr}(\omega)$ corresponding to Localization Angle Range 1 (in this case, $180° < G_\theta(\omega) \leqq 108°$) and Localization Angle Range 4 (in this case, $-36° > \theta_{lr}(\omega) \geqq -108°$) are calculated, become "1" and "0.7", respectively.

Further, with regard to the other localization ranges, that is, Localization Angle Range 2, Localization Angle Range 3, and Localization Angle Range 5, since [$gradient_{\theta 2L}=26$, $gradient_{\theta 2R}=26$, and $top\_width_{\theta 2}=30°$], [$gradient_{\theta 3L}=20$, $gradient_{\theta 3R}=180$, and $top\_width_{\theta 3}=30°$], and [$gradient_{\theta 5L}=180$, $gradient_{\theta 5R}=20$, and $top\_width_{\theta 5}=30°$], the shapes of the gain windows (gain characteristics) of the respective ranges are as shown in the drawing. Further, in this case, since the gain of Localization Angle Range 2=1.2, the gain of Localization Angle Range 3=1.0, and the gain of Localization Angle Range 5=1.0, the gain values of the respective portions of top_width become "1.3", "1.0", and "1.0", respectively. Further, as for the portions other than those of top_width of Localization Angle Range 2, Localization Angle Range 3, and Localization Angle Range 5, the shapes as shown in the drawing are obtained through the calculations based on [Expression 8], [Expression 9], and [Expression 11] (specifically, through calculations (1) and (3) of the respective expressions).

Further, in FIG. 18, since $gradient_{mag1L}$ to $gradient_{mag5L}$ and $gradient_{mag1R}$ to $gradient_{mag5R}$ are all set as "1" and further $top\_width_{mag1}$ to $top\_width_{mag5}$ are all set as "36°", a constant value is obtained in each of the localization angle ranges as shown in the drawing. Specifically, since the gains of the respective localization angles are designated as: the gain of Localization Angle Range 1=1.0; the gain of Localization Angle Range 2=0.7; the gain of Localization Angle Range 3=1.0; the gain of Localization Angle Range 4=1.3; and the gain of Localization Angle Range 5=1.0 in this case, the values of the level ratio gain $G_{mag1}(\omega)$ corresponding to the frequency bands (sub-band signals) for which the value of the level ratio $mag_{lr}(\omega)$ corresponding to Localization Angle Range 1 is calculated are all "1.0". Further, the values of the level ratio gain $G_{mag2}(\omega)$ corresponding to the frequency bands for which the value of the level ratio $mag_{lr}(\omega)$ corresponding to Localization Angle Range 2 is calculated are all "0.7", the values of the level ratio gain $G_{mag3}(\omega)$ corresponding to the frequency bands for which the value of the level ratio $mag_{lr}(\omega)$ corresponding to Localization Angle Range 3 is calculated are all "1.0", the values of the level ratio gain $G_{mag4}(\omega)$ corresponding to the frequency bands for which the value of the level ratio $mag_{lr}(\omega)$ corresponding to Localization Angle Range 4 is calculated are all "1.3", and the values of the level ratio gain $G_{mag5}(\omega)$ corresponding to the frequency bands for which the value of the level ratio $mag_{lr}(\omega)$ corresponding to Localization Angle Range 5 is calculated are all "1.0".

According to the method as described above, the phase difference gain $G_\theta(\omega)$ for adjusting the sound source localized in each localization angle range with the gain (sound volume) designated by the gain designating signal for each individual range can be calculated by using a function in which the phase difference $\theta_{lr}(\omega)$ and the gain values ($G_{set1}$ to $G_{set5}$) for individual localization angle ranges designated by the gain designating signals for individual ranges serve as variables. Likewise, the level ratio gain $G_{mag}(\omega)$ for adjusting the sound source localized in each localization angle range with the gain (sound volume) designated by the gain designating signal for each individual range can be calculated by using a function in which the level ratio $mag_{lr}(\omega)$ and the gain values ($G_{set1}$ to $G_{set5}$) for the individual localization angle ranges designated by the gain designating signals for individual ranges serve as variables.

That is, in this case, the functions to be stored in the memory section 45 may be at least [Expression 7] to [Expression 11] and [Expression 12] to [Expression 16]. Accordingly, as compared with the case in which the window function is prepared in correspondence with each of the individual gain value combinations that can be set for the respective localization angle ranges as described above, the volume of data to be stored in the memory section 45 can be reduced.

Figure 19:
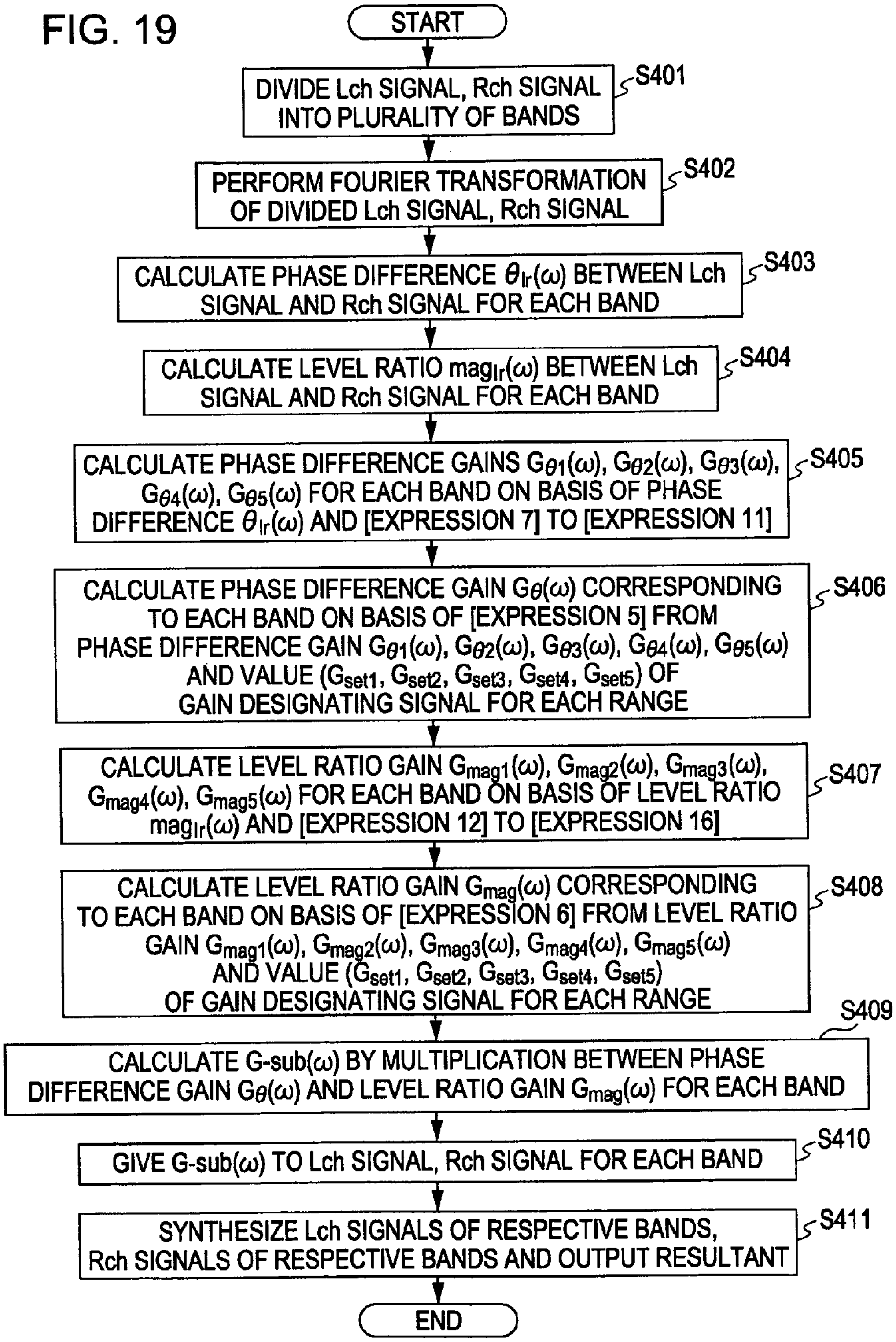
FIG. 19 is a flow chart showing the procedures of gain adjustment operation, in the case where a function using the value of the gain designating signal for each individual range and a phase difference as variables, and a function using the value of the gain designating signal for each individual range and a level ratio as variables, are used for the calculation of a gain value according to the third embodiment.

FIG. 19 is a flow chart showing the operation procedures in the case where, when performing the gain adjustment operation according to the third embodiment, the gain value is calculated as described above by using the function in which the phase difference $\theta_{lr}(\omega)$ and the gain values ($G_{set1}$ to $G_{set5}$) for the individual localization angle ranges designated by the gain designating signals for individual ranges serve as variables, and the function in which the level ratio $mag_{lr}(\omega)$ and the gain values ($G_{set1}$ to $G_{set5}$) for the individual localization angle ranges designated by the gain designating signals for the individual ranges serve as variables.

First, in this case, in steps S401 to S404, in the same manner as in steps S301 to S304 shown in FIG. 16 mentioned above, the band division and Fourier transformation of the Lch signal and Rch signal, and the calculation of the phase difference $\theta_{lr}(\omega)$ and level ratio $mag_{lr}(\omega)$ for each individual band are performed.

Further, in this case, in the next step S405, the phase difference gains $G_{\theta 1}(\omega)$, $G_{\theta 2}(\omega)$, $G_{\theta 3}(\omega)$, $G_{\theta 4}(\omega)$, and $G_{\theta 5}(\omega)$ are calculated for the individual bands on the basis of the phase difference $\theta_{lr}(\omega)$ and [Expression 7] to [Expression 11]. That is, the gain calculator 44 in each band-specific gain calculating circuit 12 performs computation based on the phase difference $\theta_{lr}(\omega)$ input from the phase difference calculator 22 and [Expression 7] to [Expression 11] that are previously set, thereby calculating the phase difference gains $G_{\theta 1}(\omega)$, $G_{\theta 2}(\omega)$, $G_{\theta 3}(\omega)$, $G_{\theta 4}(\omega)$, and $G_{\theta 5}(\omega)$.

Then, in step S406 that follows, on the basis of [Expression 5], the phase difference gain $G_{\theta}(\omega)$ corresponding to each band is calculated from the phase difference gains $G_{\theta 1}(\omega)$, $G_{\theta 2}(\omega)$, $G_{\theta 3}(\omega)$, $G_{\theta 4}(\omega)$, and $G_{\theta 5}(\omega)$ and the values ($G_{set1}$, $G_{set2}$, $G_{set3}$, $G_{set4}$, and $G_{set5}$) of the gain designating signal for each individual range. That is, the gain calculator 44 in each band-specific gain calculating circuit 12 calculates the phase difference gain $G_{\theta}(\omega)$ to be set for the corresponding frequency band (sub-band signal) by performing computation based on [Expression 5] from the phase difference gain $G_{\theta}(\omega)$ (that is, one of $G_{\theta 1}(\omega)$, $G_{\theta 2}(\omega)$, $G_{\theta 3}(\omega)$, $G_{\theta 4}(\omega)$, and $G_{\theta 5}(\omega)$ calculated in step S405, and the value of the gain designating signal for each individual range supplied from the system controller 5.

Further, in step S407, the level ratio gains $G_{mag1}(\omega)$, $G_{mag2}(\omega)$, $G_{mag3}(\omega)$, $G_{mag4}(\omega)$, and $G_{mag5}(\omega)$ are calculated for the individual bands on the basis of the level ratio $mag_{lr}(\omega)$ and [Expression 12] to [Expression 16]. That is, the gain calculator 44 in each band-specific gain calculating circuit 12 performs computation based on the level ratio $mag_{lr}(\omega)$ input from the level ratio calculator 23 and [Expression 12] to [Expression 16] that are previously set, thereby calculating the level ratio gains $G_{mag1}(\omega)$, $G_{mag2}(\omega)$, $G_{mag3}(\omega)$, $G_{mag4}(\omega)$, and $G_{mag5}(\omega)$.

Further, in step S408, on the basis of [Expression 6], the level ratio gain $G_{mag}(\omega)$ corresponding to each band is calculated from the level ratio gains $G_{mag1}(\omega)$, $G_{mag2}(\omega)$, $G_{mag3}(\omega)$, $G_{mag4}(\omega)$, and $G_{mag5}(\omega)$ and the values ($G_{set1}$, $G_{set2}$, $G_{set3}$, $G_{set4}$, and $G_{set5}$) of the gain designating signal for each individual range. That is, the gain calculator 44 in each band-specific gain calculating circuit 12 calculates the level ratio gain $G_{mag}(\omega)$ to be set for the corresponding frequency band (sub-band signal) by performing computation based on [Expression 6] from the level ratio gain $G_{mag}(\omega)$ (that is, one of $G_{mag1}(\omega)$, $G_{mag2}(\omega)$, $G_{mag3}(\omega)$, $G_{mag4}(\omega)$, and $G_{mag5}(\omega)$ calculated in step S407, and the value of the gain designating signal for each individual range supplied from the system controller 5.

It should be noted that in this case as well, for the convenience of description, the calculation of the phase difference $\theta_{lr}(\omega)$/phase difference gain $G_{\theta}(\omega)$ and the calculation of the level ratio $mag_{lr}(\omega)$/level ratio gain $G_{mag}(\omega)$ are carried out one after the other. However, in actuality, these calculations are carried out simultaneously and in parallel.

Then, in steps S409 to S411, in the same manner as in steps S308 to S310 shown in FIG. 16 mentioned above, the gain calculator 44 multiplies the phase difference gain $G_{\theta}(\omega)$ and the level ratio gain $G_{mag}(\omega)$ for each individual band to calculate the gain value G-sub($\omega$). Further, for each individual band, the gain unit 13 gives the gain value G-sub($\omega$) to each of the Lch signal and Rch signal, and then the synthesis filter bank 14L and the synthesis filter bank 14R synthesize the Lch signals of respective bands and the Rch signals of respective bands, respectively, and output the resultant.

It should be noted that in the above-mentioned example as well, the gain adjustment operation for each individual localization angle range using [Expression 5] to [Expression 16] as described above is realized by the hardware configuration of the audio signal processing section 33. However, it is also possible to realize a part or the entirely of this operation by software processing. In this case, the audio signal processing section 33 may be configured by a microcomputer or the like that operates in accordance with a program for executing the corresponding processing shown in FIG. 19. In this case, the audio signal processing section 33 includes a recording medium such as a ROM, into which the above-mentioned program is recorded.

Here, as the method of performing gain adjustment for each individual localization angle range, other than the method of calculating the gain value using [Expression 5] to [Expression 16] as described above, it is also possible to adopt a method in which, for example, with the gain values at the midpoints of respective thresholds ($T_0$ $T_5$) taken as the gain values designated by the gain designating signals for the individual ranges, linear interpolation or curved interpolation is performed therebetween. In this case as well, since no window function is used, it is possible to achieve a corresponding reduction in the requisite capacity of the memory section 45.

Further, in performing the gain adjustment for each individual localization angle range according to the third embodiment, it is also possible to adopt the following method.

That is, first, in correspondence with each individual localization angle range, a system for generating the audio signal Lex and audio signal Rex for extracting the sound source localized in that localization angle range is provided. That is, in this case, there are provided a system for generating the audio signal Lex and audio signal Rex for extracting the sound source localized in Localization Angle Range 1, a system for generating the audio signal Lex and audio signal Rex for extracting the sound source localized in Localization Angle Range 2, a system for generating the audio signal Lex and audio signal Rex for extracting the sound source localized in Localization Angle Range 3, a system for generating the audio signal Lex and audio signal Rex for extracting the sound source localized in Localization Angle Range 4, and a system for generating the audio signal Lex and audio signal Rex for extracting the sound source localized in Localization Angle Range 5. For example, such a configuration may be perceived as one in which five systems of audio signal processing sections 3 according to the first embodiment are provided.

Then, a gain adjusting circuit is provided in correspondence with each one of the outputs of the audio signals Lex/audio signal Rex of these plurality of systems, and in each of these gain adjusting circuits adjusts, in accordance with the gain value for each individual localization angle range designated by the gain designating signal for each individual range, the gain of the audio signal Lex/audio signal Rex is adjusted and output. Then, the respective audio signals Lex and the respective audio signals Rex output from these gain adjusting circuits are respectively synthesized and output.

Accordingly, in the same manner as described above, the sound source localized in each localization range can be adjusted in accordance with the value of the gain designating signal for each individual range.

<Modifications of Embodiments>

While the embodiments of the present invention have been described in the foregoing, the present invention is not limited to the respective embodiments described above.

For example, while in the respective embodiments audio signals of only 2 channels, Lch and Rch, are used, the present invention can be adapted to the case of using audio signals of more than 2 channels.

In the respective embodiments, the phase difference and the level ratio are respectively calculated by the phase difference calculator 22 and level ratio calculator 23 of the band-specific gain calculating circuit 12, the phase difference gain and the level ratio gain are respectively determined in accordance with the calculated phase difference and level ratio, and the final gain G-sub is determined by multiplying these gains together. However, it is also possible to multiply the determined phase difference gain and level ratio gain by a suitable factor and perform addition, and set the resultant as the final gain G-sub.

Further, while in the respective embodiments the gain value to be set for the audio signal is calculated on the basis of the calculation results of the phase difference and level ratio of the audio signals of the respective channels, the gain value may be calculated on the basis of only one of the phase difference and level ratio. It should be noted that with respect to audio signals of high audio frequencies, the strength of the relationship between the phase difference thereof and the perceived localization angle decreases. Accordingly, with respect to the phase difference, the calculation may be performed only for signals of 4 kHz or less, for example.

Further, other than the level ratio, any other factor indicative of the difference in sound pressure level between respective channel signals may be calculated, and the gain value may be calculated on the basis of this factor.

Further, while in the respective embodiments the media reproduction section 2 reproduces the audio signal (and video signal) from the recording medium, the media reproduction section 2 may be configured as a tuner apparatus that receives/demodulates AM/FM or TV broadcasting to output an audio signal (and a video signal).

Alternatively, in addition to be configured as one including the media reproduction section 2 as described above and having the reproducing function with respect to a recording medium or the broadcasting signal receiving function, the reproducing apparatus in each of the embodiments may be configured as one to which an audio signal that has been externally reproduced (received) is input and which performs audio signal processing with respect to this input audio signal.

Further, in the second embodiment, a configuration in adopted in which, as the adjustment of an audio signal according to the zoom magnification, the sound volume of a sound image localized at the angle designated by the left/right key (10*a*, 10*b*) can be manually adjusted in accordance with the zoom-in/zoom-out operation using the up key 10*c*/down key 10*d*, for example. However, this configuration may also be applied to the case where reproduction is performed only with respect to an audio signal as in the first embodiment.

That is, even when reproduction is performed only with respect to an audio signal, the sound volume of a sound image localized at a designated angle is adjusted in accordance with a manual operation using the up key 10*c*/down key 10*d* or the like.

Further, in the second embodiment, it is also possible to adopt a configuration in which the range of the sound source to be extracted is widened or narrowed in accordance with the zoom-in/zoom-out operation using the up key 10*c*/down key 10*d*, for example.

That is, for example, by making the value of top_width or gradient in [Expression 3] and [Expression 4] smaller in accordance with the zoom-in operation using the up key 10*c*, and making the value of top_width or gradient larger in accordance with the zoom-out operation using the down key 10*d*, the range of the sound source to be extracted is changed in synchronization with the zoom-in/zoom-out operation.

Further, while the third embodiment is directed to the example in which gain adjustment for each individual localization angle range is performed when reproduction is performed only with respect to an audio signal as in the first embodiment, it is also possible to adopt a configuration in which gain adjustment for each individual localization angle range is performed even when reproduction is performed also with respect to a video signal as in the second embodiment.

It should be understood by those skilled in the art that various modifications, combinations, sub-combinations and alterations may occur depending on design requirements and other factors insofar as they are within the scope of the appended claims or the equivalents thereof.

What is claimed is:

1. An audio signal processing apparatus comprising:

dividing means for dividing audio signals of a plurality of channels into a plurality of frequency bands;

phase difference calculating means for calculating a phase difference between the audio signals of the plurality of channels for each of the plurality of frequency bands divided by the dividing means;

level ratio calculating means for calculating a level ratio between the audio signals of the plurality of channels for each of the plurality of frequency bands divided by the dividing means; and audio signal processing means for determining, for each of the plurality of frequency bands, a single gain value based, at least in part, on information on a designated localization angle indicative of a location of an audio source providing an audio signal for extraction from the audio signals and the phase difference and the level ratio for each of the plurality of frequency bands calculated by the phase difference calculating means and the level ratio calculating means and applying, to the audio signals in each of the plurality of frequency bands, the corresponding single gain value to extract the audio signal provided by the sound source localized at the designated localization angle.

2. The audio signal processing apparatus according to claim 1, further comprising:

video inputting means for inputting a video signal synchronized with an audio signal;

video signal processing means for performing video signal processing so that a part of a video obtained on the basis of the video signal is enlarged; and localization angle designating means for designating the localization angle in accordance with a position of the part of the video enlarged by the video signal processing means.

3. The audio signal processing apparatus according to claim 2, further comprising:

gain value designating means for designating a gain value according to a magnification at which the part of the video is enlarged by the video signal processing means, wherein:

the audio signal processing means determines, for each of the plurality of frequency bands, the single gain value based, at least in part, on the phase difference and the level ratio for each of the plurality of frequency bands calculated by the phase difference calculating means and the level ratio calculating means, the localization angle designated by the localization angle designating means, and the gain value designated by the gain value designating means.

4. The audio signal processing apparatus according to claim 1, further comprising:

range gain value designating means for designating a gain value for each of a plurality of localization angle ranges that are set in advance, wherein:

the audio signal processing means determines, for each of the plurality of frequency bands, the single gain value based, at least in part, on the phase difference and the level ratio for each of the plurality of frequency bands calculated by the phase difference calculating means and the level ratio calculating means, and the gain value for each of the localization angle ranges designated by the range gain value designating means.

5. The audio signal processing apparatus according to claim 4, wherein:

the audio signal processing means selects, from among a plurality of window functions set for each combination of gain values that can be designated in advance for each of the localization angle ranges, a window function corresponding to the gain value for each of the localization angle ranges designated by the range gain value designating means; and the audio signal processing means calculates a gain value to be set for each of the divided signals, on the basis of the selected window function, and the phase difference and the level ratio for each of the plurality of frequency bands calculated by the phase difference calculating means and the level ratio calculating means.

6. The audio signal processing apparatus according to claim 4, wherein:

the audio signal processing means calculates a gain value to be set for each of the divided signals, on the basis of a function in which the gain value for each of the localization angle ranges designated by the range gain value designating means and the phase difference calculated by the phase difference calculating means serve as variables, and a function in which the gain value for each of the localization angle ranges designated by the range gain value designating means and the level ratio calculated by the level ratio calculating means serve as variables.

7. An audio signal processing method comprising:

dividing each of audio signals of a plurality of channels into a plurality of frequency bands;

calculating a phase difference between the audio signals of the plurality of channels, for each of the plurality of frequency bands;

calculating a level ratio between the audio signals of the plurality of channels, for each of the plurality of frequency bands;

receiving, from a system controller, information on a designated localization angle indicative of a location of an audio source providing an audio signal for extraction from the audio signals; and determining, by a band-specific gain calculating circuit for each of the plurality of frequency bands, a single gain value based, at least in part, on the received information on a designated localization angle and the phase difference and the level ratio for each of the plurality of frequency bands; and applying, to the audio signals in each of the plurality of frequency bands, the corresponding single gain value to extract the audio signal provided by the sound source localized at the designated localization angle.

8. An audio signal processing apparatus comprising:

a dividing section configured to divide audio signals of a plurality of channels into a plurality of frequency bands;

a phase difference calculating section configured to calculate a phase difference between the audio signals of the plurality of channels, for each of the plurality of frequency bands divided by the dividing section;

a level ratio calculating section configured to calculate a level ratio between the audio signals of the plurality of channels, for each of the plurality of frequency bands divided by the dividing section; and an audio signal processing section comprising a plurality of band-specific gain calculating circuits configured to determine, for each of the plurality of frequency bands, a single gain value based, at least in part, on information on a designated localization angle indicative of a location of an audio source providing an audio signal for extraction from the audio signals and the phase difference and the level ratio for each of the plurality of frequency bands calculated by the phase difference calculating section and the level ratio calculating section and applying, to the audio signals in each of the plurality of frequency bands, the corresponding single gain value to extract the audio signal provided by the sound source localized at the designated localization angle.

* * * * *